United States Patent
Santra et al.

(10) Patent No.: US 12,307,821 B2
(45) Date of Patent: May 20, 2025

(54) RADAR-BASED GESTURE CLASSIFICATION USING A VARIATIONAL AUTO-ENCODER NEURAL NETWORK

(71) Applicant: Infineon Technologies AG, Neubiberg (DE)

(72) Inventors: Avik Santra, Munich (DE); Souvik Hazra, Munich (DE); Thomas Reinhold Stadelmayer, Wenzenbach (DE)

(73) Assignee: Infineon Technologies AG, Neubiberg (DE)

(*) Notice: Subject to any disclaimer, the term of this patent is extended or adjusted under 35 U.S.C. 154(b) by 314 days.

(21) Appl. No.: 17/886,264

(22) Filed: Aug. 11, 2022

(65) Prior Publication Data
US 2023/0068523 A1  Mar. 2, 2023

(30) Foreign Application Priority Data
Aug. 12, 2021 (EP) .................... 21190926

(51) Int. Cl.
| | |
|---|---|
| *G06V 10/00* | (2022.01) |
| *G06V 10/74* | (2022.01) |
| *G06V 10/762* | (2022.01) |
| *G06V 10/82* | (2022.01) |
| *G06V 40/20* | (2022.01) |

(52) U.S. Cl.
CPC ............ *G06V 40/20* (2022.01); *G06V 10/761* (2022.01); *G06V 10/763* (2022.01); *G06V 10/82* (2022.01)

(58) Field of Classification Search
CPC ............ G06N 3/08; G06N 3/02; G06N 3/042; G06N 3/045; G06N 3/047; G06N 3/049; G06N 3/082; G06N 3/092; G06N 3/0475; G06N 3/0454; G06N 3/0464; G06V 10/82; G06V 10/761; G06V 10/763; G06V 40/28; G06V 40/20; G06F 18/24133; G01S 7/415; G01S 7/417; G01S 13/584; G01S 13/589
See application file for complete search history.

(56) References Cited

U.S. PATENT DOCUMENTS

| | | | |
|---|---|---|---|
| 10,205,457 B1 * | 2/2019 | Josefsberg | ............ H03L 7/091 |
| 10,466,772 B2 * | 11/2019 | Trotta | ................. B60R 16/037 |
| 10,699,538 B2 * | 6/2020 | Novich | ................... G10H 3/26 |
| 10,937,438 B2 * | 3/2021 | Narayanan | ............. G10L 25/03 |
| 11,036,303 B2 * | 6/2021 | Rani | ..................... G06N 20/00 |
| 11,354,823 B2 * | 6/2022 | Lerchner | ................ G06N 3/045 |
| 11,432,753 B2 * | 9/2022 | Alam | ...................... A61B 7/04 |
| 11,475,910 B2 * | 10/2022 | Jun | ...................... G06N 3/045 |

(Continued)

OTHER PUBLICATIONS

Ahmed, S. et al., "Finger-Counting-Based Gesture Recognition within Cars Using Impulse Radar with Convolutional Neural Network," sensors, MDPI, Mar. 23, 2019, 14 pages.

(Continued)

*Primary Examiner* — Amir Alavi
(74) *Attorney, Agent, or Firm* — Slater Matsil, LLP

(57) ABSTRACT

In an embodiment, a method includes: obtaining one or more positional time spectrograms of a radar measurement of a scene comprising an object; and based on the one or more positional time spectrograms and based on a feature embedding of a variational auto-encoder neural network, predicting a gesture class of a gesture performed by the object.

20 Claims, 15 Drawing Sheets

(56) References Cited

U.S. PATENT DOCUMENTS

| | | | | |
|---|---|---|---|---|
| 11,640,208 | B2* | 5/2023 | Hazra | G06N 3/08 706/20 |
| 11,774,553 | B2* | 10/2023 | Santra | G01S 7/417 342/109 |
| 2021/0034160 | A1* | 2/2021 | Hof | G06F 3/0416 |
| 2023/0068523 | A1* | 3/2023 | Santra | G06V 40/28 |

OTHER PUBLICATIONS

Deng, J. et al., "ArcFace: Additive Angular Margin Loss for Deep Face Recognition," 2019 IEEE/CVF Conference on Computer Vision and Pattern Recognition (CVPR), Jan. 9, 2020, 10 pages.

Dubey, A. et al., "A Bayesian Framework for Integrated Deep Metric Learning and Tracking of Vulnerable Road Users Using Automotive Radars", IEEE Acess, May 5, 2021, 20 pages.

Erol, B. et al., "Exploitation of motion capture data for improved synthetic micro-doppler signature generation with adversarial learning", SPIE Proceedings, May 18, 2020, 8 pages.

Gurbuz, S. et al., "Radar-Based Human-Motion Recognition With Deep Learning: Promising applications for indoor monitoring", IEEE Signal Processing Magazine, Jul. 2019, 13 pages.

Hazra, S. et al., "Robust Gesture Recognition Using Millimetric-Wave Radar System," IEEE Sensors Letters, vol. 2, No. 4, Dec. 2018, 4 pages.

Hazra, S. et al., "Short-Range Radar-Based Gesture Recognition System Using 3D CNN With Triplet Loss," IEEE Access, Sep. 17, 2019, 11 pages.

He, L. et al., "Softmax Dissection: Towards Understanding Intra- and Inter-Class Objective for Embedding Learning," The Thirty-Fourth AAAI Conference on Artificial Intelligence (AAAI-20), Feb. 12, 2020, 8 pages.

Kim, Y. et al., "Hand Gesture Recognition Using Micro-Doppler Signatures With Convolutional Neural Network," IEEE Access, Oct. 13, 2016, 6 pages.

Kingma, D. et al., "Auto-Encoding Variational Bayes," arXiv:1312.6114v10, May 1, 2014, 14 pages.

Li, G. et al., "Sparsity-Driven Micro-Doppler Feature Extraction for Dynamic Hand Gesture Recognition," IEEE Transactions on Aerospace and Electronic Systems, Apr. 2018, 21 pages.

Lien, J. et al., "Soli: Ubiquitous Gesture Sensing with Millimeter Wave Radar," ACM Trans. Graph., vol. 35, No. 4, Article 142, Jul. 2016, 19 pages.

Liu, W. et al., "SphereFace: Deep Hypersphere Embedding for Face Recognition," Computer Vision Foundation, Apr. 26, 2017, 9 pages.

Molchanov, P. et al., "Online Detection and Classification of Dynamic Hand Gestures with Recurrent 3D Convolutional Neural Networks," Computer Vision Foundation, Dec. 12, 2016, 9 pages.

Molchanov, P. et al., "Short-Range FMCW Monopulse Radar for Hand-Gesture Sensing," 2015 IEEE Radar Conference (RadarCon), Jun. 25, 2015, 6 pages.

Rautaray, S. et al., "Vision based hand gesture recognition for human computer interaction: a survey," Artificial Intelligence Review, Nov. 6, 2012, 54 pages.

Smith, K. et al., "Gesture Recognition Using mm-Wave Sensor for Human-Car Interface," ResearchGate, Sensors Letters, Feb. 2018, 5 pages.

Stadelmayer, T. et al., "Human Activity Classification Using mm-Wave FMCW Radar by Improved Representation Learning," mmNets'20: Proceedings of the 4th ACM Workshop on Millimeter-Wave Networks and Sensing Systems, Sep. 2020, 6 pages.

Sun, Y. et al., "Automatic Radar-based Gesture Detection and Classification via a Region-based Deep Convolutional Neural Network," ResearchGate, May 2019, 7 pages.

Sun, Y. et al., "Real-Time Radar-Based Gesture Detection and Recognition Built in an Edge-Computing Platform," EEE Sensors Journal, arXiv:2005.10145v1, May 20, 2020, 10 pages.

Wan, Q. et al., "Gesture Recognition for Smart Home Applications using Portable Radar Sensors," ResearchGate, 36th Annual International Conference of the IEEE Engineering in Medicine and Biology Society, Aug. 2014, 5 pages.

Wang, F. et al., "Additive Margin Softmax for Face Verification," IEEE Signal Processing Letters, arXiv:1801.05599v4, May 30, 2018, 7 pages.

Wang, H. et al., "CosFace: Large Margin Cosine Loss for Deep Face Recognition," CVPR, IEEE, Dec. 16, 2018, 10 pages.

Wang, S. et al., "Interacting with Soli: Exploring Fine-Grained Dynamic Gesture Recognition in the Radio-Frequency Spectrum," UIST '16: Proceedings of the 29th Annual Symposium on User Interface Software and Technology, Oct. 2016, 10 pages.

Wen, Y. et al., "A Discriminative Feature Learning Approach for Deep Face Recognition," Lecture Notes in Computer Science, Sep. 16, 2016, 17 pages.

Wikipedia, "Electromagnetic coil," https://en.wikipedia.org/w/index.php?title=Electromagnetic_coil&oldid=776415501, Jul. 11, 2018, 6 pages.

Wikipedia, "Qi (standard)," https://en.wikipedia.org/w/index.php?title=Qi_(standard)&oldid=803427516, Jul. 11, 2018, 5 pages.

Zhang, J. et al., "Doppler-Radar Based Hand Gesture Recognition System Using Convolutional Neural Networks", arXiv;1711.02254v3, Nov. 22, 2017, 8 pages.

Zhang, Z. et al., "Latern: Dynamic Continuous Hand Gesture Recognition Using FMCW Radar Sensor," IEEE Sensors Journal, vol. 18, No. 8, Apr. 15, 2018, 12 pages.

\* cited by examiner

RADAR-BASED GESTURE CLASSIFICATION USING A VARIATIONAL AUTO-ENCODER NEURAL NETWORK

CROSS-REFERENCE TO RELATED APPLICATIONS

This application claims the benefit of European Application No. 21190926, filed on Aug. 12, 2021, which application is hereby incorporated herein by reference.

TECHNICAL FIELD

Various examples of the disclosure are broadly concerned with recognizing gestures based on a radar measurement.

BACKGROUND

Human-machine interaction (HMI) can be facilitated by gesture classification (sometimes also referred to as gesture recognition). For instance, hand or finger gestures can be recognized and classified. Gesture classification finds applications in smartphones, sign language interfaces, automotive infotainment systems, augmented reality-virtual reality systems and smart appliances. Further, gesture classification can facilitate HMI for vending and ticketing machines at public places.

Traditionally, gesture classification is based on camera images. See, e.g., S. Rautaray and A. Agrawal. 2015. Vision based hand gesture classification for human computer interaction: a survey. Artificial Intelligence Review 43, 1 (2015), 1-54. https://doi.org/10.1007/s10462-012-9356-9.

However, camera-based gesture classification suffers from the problems of requiring proper illumination conditions, occlusions from clothing, obstruction at camera lens opening and privacy intruding features.

Since radar measurements are not or at least less severely affected by many of such limitations like improper lightning and privacy issues, radar-based gesture classification provides an attractive alternative. Further, the processing and memory footprint of the solution can be relatively thin making them favorable for embedded implementation.

Several previous works showed the feasibility of recognizing different hand gestures with high accuracy. See, e.g.:

S. Ahmed, F. Khan, A. Ghaffar, F. Hussain, and S. Cho. 2019. Finger-Counting-Based Gesture Recognition within Cars Using Impulse Radar with Convolutional Neural Network. Sensors 19, 6 (March 2019), 1429;

S. Hazra and A. Santra. 2018. Robust Gesture Recognition Using Millimetric-Wave Radar System. IEEE Sensors Letters 2, 4 (2018), 1-4;

S. Hazra and A. Santra. 2019. Short-Range Radar-Based Gesture Recognition System Using 3D CNN With Triplet Loss. IEEE Access 7 (2019), 125623-12563;

Y. Kim and B. Toomajian. 2016. Hand Gesture Recognition Using Micro-Doppler Signatures With Convolutional Neural Network. IEEE Access 4 (2016), 7125-7130;

G. Li, R. Zhang, M. Ritchie, and H. Griffiths. 2018. Sparsity-Driven Micro-Doppler Feature Extraction for Dynamic Hand Gesture Recognition. IEEE Trans. Aerospace Electron. Systems 54, 2 (2018), 655-665;

J. Lien, N. Gillian, E. Karagozler, P. Amihood, C. Schwesig, E. Olson, H. Raja, and I. Poupyrev. 2016. Soli: Ubiquitous Gesture Sensing with Millimeter Wave Radar. ACM Trans. Graph. 35, 4, Article 142 (July 2016);

P. Molchanov, S. Gupta, K. Kim, and K. Pulli. 2015. Short-range FMCW monopulse radar for hand-gesture sensing. In 2015 IEEE Radar Conference (RadarCon). 1491-1496;

P. Molchanov, X. Yang, S. Gupta, K. Kim, S. Tyree, and J. Kautz. 2016. Online Detection and Classification of Dynamic Hand Gestures with Recurrent 3D Convolutional Neural Networks. In 2016 IEEE Conference on Computer Vision and Pattern Recognition (CVPR). 4207-4215;

K. A. Smith, C. Csech, D. Murdoch, and G. Shaker. 2018. Gesture Recognition Using mm-Wave Sensor for Human-Car Interface. IEEE Sensors Letters 2, 2 (2018), 1-4;

Y. Sun, T. Fei, S. Gao, and N. Pohl. 2019. Automatic Radar-based Gesture Detection and Classification via a Region-based Deep Convolutional Neural Network. In ICASSP 2019-2019 IEEE International Conference on Acoustics, Speech and Signal Processing (ICASSP). 4300-4304;

Yuliang Sun, Tai Fei, Xibo Li, Alexander Warnecke, Ernst Warsitz, and Nils Pohl. 2020. Real-time radar-based gesture detection and recognition built in an edge-computing platform. IEEE Sensors Journal 20, 18 (2020), 10706-10716;

Q. Wan, Y. Li, C. Li, and R. Pal. 2014. Gesture recognition for smart home applications using portable radar sensors. In 2014 36th Annual International Conference of the IEEE Engineering in Medicine and Biology Society. 6414-6417;

S. Wang, J. Song, J. Lien, I. Poupyrev, and O. Hilliges. 2016. Interacting with *Soli*: Exploring Fine-Grained Dynamic Gesture Recognition in the Radio-Frequency Spectrum. In Proceedings of the 29th Annual Symposium on User Interface Software and Technology (Tokyo, Japan) (UIST'16). Association for Computing Machinery, New York, NY, USA, 851-860;

Z. Zhang, Z. Tian, and M. Zhou. 2018. Latern: Dynamic Continuous Hand Gesture Recognition Using FMCW Radar Sensor. IEEE Sensors Journal 18 (2018), 3278-3289;

J. Deng, J. Guo, N. Xue, and S. Zafeiriou. 2019. Arcface: Additive angular margin loss for deep face recognition. In Proceedings of the IEEE Conference on Computer Vision and Pattern Recognition. 4690-4699;

W. Liu, Y. Wen, Z. Yu, M. Li, B. Raj, and L. Song. 2017. SphereFace: Deep Hypersphere Embedding for Face Recognition. CoRR abs/1704.08063 (2017). arXiv: 1704.08063;

F. Wang, J. Cheng, W. Liu, and H. Liu. 2018. Additive margin softmax for face verification. IEEE Signal Processing Letters 25, 7 (2018), 926-930;

H. Wang, Y. Wang, Z. Zhou, X. Ji, Z. Li, D. Gong, J. Zhou, and W. Liu. 2018. CosFace: Large Margin Cosine Loss for Deep Face Recognition. CoRR abs/1801.09414 (2018). arXiv: 1801.09414;

L. He, Z. Wang, Y. Li, and S. Wang. 2020. Softmax Dissection: Towards Understanding Intra- and Inter-class Objective for Embedding Learning. ArXiv abs/1908.01281 (2020);

Y. Wen, K. Zhang, Z. Li, and Y. Qiao. 2016. A discriminative feature learning approach for deep face recognition. In European conference on computer vision. Springer, 499-515; and T. Stadelmayer, M. Stadelmayer, A. Santra, R. Weigel, and F. Lurz. 2020. Human Activity Classification Using Mm-Wave FMCW Radar by Improved Representation Learning. In Proceedings of the 4th ACM Workshop on Millimeter-Wave Networks and Sensing Systems (London, United Kingdom) (mmNets'20). Association for Computing Machinery, New York, NY, USA, Article 1, 6 pages.

SUMMARY

It has been observed that such gesture recognition based on radar measurements using known techniques can sometimes show limited accuracy.

Accordingly, there is a need for advanced techniques of gesture recognition based on radar measurements. In particular, there is a need for gesture recognition using radar measurements having increased accuracy.

This need is met by the features of the independent claims. The features of the dependent claims define embodiments.

In an embodiment, a variational-autoencoder neural network algorithm is employed. The algorithm can be trained using a triplet loss and center loss. A statistical distance can be considered for these losses.

Hereinafter, techniques will be disclosed that facilitate gesture recognition based on radar measurements. A specific type of architecture of a neural network algorithm, a variational auto-encoder neural network algorithm, can be used to facilitate the gesture recognition. Specific training techniques for training the variational auto-encoder neural network algorithm are disclosed. These techniques disclosed herein facilitate robust gesture recognition, also for scenarios where radar signals are exposed to noise and/or where inter-user variability of motion patterns associated with the various gestures is encountered. Further, unknown motion patterns—not associated with any predefined gesture class—can be reliably detected as such and rejected.

A computer-implemented method includes obtaining one or more positional time spectrograms of a radar measurement of a scene. The scene includes an object. The computer-implemented method also includes predicting a gesture class of a gesture performed by the object based on one or more positional time spectrograms and based on a feature embedding of a variational auto-encoder neural network algorithm.

A computer program or a computer-program product or a computer-readable storage medium includes program code. The program code can be loaded and executed by a processor. Upon executing the program code, the processor performs a method. The computer-implemented method includes obtaining one or more positional time spectrograms of a radar measurement of a scene. The scene includes an object. The computer-implemented method also includes predicting a gesture class of a gesture performed by the object based on one or more positional time spectrograms and based on a feature embedding of a variational auto-encoder neural network algorithm.

A device includes a processor and a memory. The processor can load program code from a memory and execute the program code. Upon loading and executing the program code, the processor is configured to obtain one or more positional time spectrograms of a radar measurement of a scene. The scene includes an object. The processor is also configured to predict a gesture class of a gesture performed by the object based on one or more positional time spectrograms and based on a feature embedding of a variational auto-encoder neural network algorithm.

A computer-implemented method of training a variational auto-encoder neural network algorithm for predicting a gesture class of a gesture performed by an object of a scene, the gesture class being selected from a plurality of gesture classes, includes obtaining multiple training sets of one or more training positional time spectrograms of a radar measurement of the scene including the object. Each one of the multiple training sets is associated with a respective ground-truth label indicative of a respective gesture class. Also, the computer-implemented method includes training the variational auto-encoder neural network algorithm based on the multiple training sets and the associated ground-truth labels.

A computer program or a computer-program product or a computer-readable storage medium includes program code. The program code can be loaded and executed by a processor. Upon executing the program code, the processor performs a method of training a variational auto-encoder neural network algorithm for predicting a gesture class of a gesture performed by an object of a scene, the gesture class being selected from a plurality of gesture classes. The method includes obtaining multiple training sets of one or more training positional time spectrograms of a radar measurement of the scene including the object. Each one of the multiple training sets is associated with a respective ground-truth label indicative of a respective gesture class. Also, the computer-implemented method includes training the variational auto-encoder neural network algorithm based on the multiple training sets and the associated ground-truth labels.

A device includes a processor and a memory. The processor can load program code from a memory and execute the program code. Upon loading and executing the program code, the processor is configured to obtain multiple training sets of one or more training positional time spectrograms of a radar measurement of a scene including an object. Each one of the multiple training sets is associated with a respective ground-truth label indicative of a respective gesture class of a gesture performed by the object, the gesture class being selected from a plurality of gesture classes. The computer-implemented method also includes training a variational auto-encoder neural network algorithm based on the multiple training sets and the associated ground-truth labels.

It is to be understood that the features mentioned above and those yet to be explained below may be used not only in the respective combinations indicated, but also in other combinations or in isolation without departing from the scope of the invention.

DETAILED DESCRIPTION OF ILLUSTRATIVE EMBODIMENTS

Figure 1:
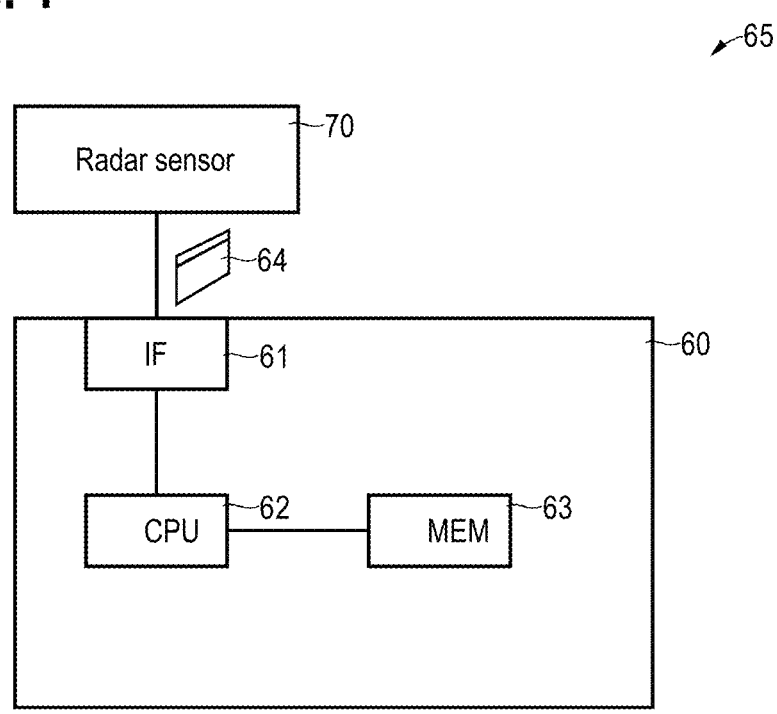
FIG. 1 schematically illustrates a system including a radar sensor and a processing device according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are not to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connections or coupling. A coupling between components may also be established over a wireless connection. Functional blocks may be implemented in hardware, firmware, software, or a combination thereof.

Various examples of the disclosure generally relate to gesture classification. In particular, using the techniques described herein, hand gestures or finger gestures or gestures performed using a handheld object can be recognized. Such object can perform the gesture in free space. I.e., the gesture may be defined by a 3-D motion of the object, e.g., along a trajectory and/or including self-rotation. It would also be possible to recognize other kinds and types of gestures, e.g., body-pose gestures or facial expression gestures.

In detail, gesture classification can used to predict a gesture class of a gesture. For example, there can be a predefined set of gesture classes. Then, once such an object performs a gesture, it can be judged whether this gesture is part of one of the gesture classes. For this, it can be judged whether certain features of the gesture match respective feature ranges associated with the gesture class.

In some examples, optionally, it would be possible to determine that the gesture is not part of any one of the gesture classes—but, e.g., rather is part of a yet-to-be-defined gesture class or corresponds to a general object movement not resembling a gesture. I.e., new gesture classes can be identified.

Various gesture classes are conceivable. The particular choice of the set of gesture classes used for the gesture classification is not germane for the functioning of the techniques described herein. Nonetheless, hereinafter, a few examples will be given for possible gesture classes:

TABLE 1 examples of various gesture classes that could be used in a respective predefined set to implement the gesture classification. These gesture classes define the gestures that can be recognized. Further details with respect to such gesture classes will be explained in connection with FIG. 3.

| | |
|---|---|
| (1) | Swipe left to right |
| (2) | Swipe right to left |
| (3) | Swipe top to down |
| (4) | Swipe down to top |
| (5) | Circle clockwise |
| (6) | Circle anti-clockwise |
| (7) | Swipe back to front |
| (8) | Swipe front to back |
| (9) | Finger wave - wave single fingers |
| (10) | Finger rub - thumb sliding over fingers |

Based on gesture classification, an HMI can be implemented. It is possible to control a machine. For instance, different actions could be triggered depending on the gesture class of the recognized gesture. The HMI can facilitate control of a machine by a user.

As a general rule, the techniques described herein are not limited to a particular use case of the HMI. Example use cases include: gesture-controlled wearable and mobile devices, gesture-controlled smart TVs, projectors, gesture-controlled smart homes and smart devices, automotive infotainment systems, augmented reality-virtual reality (AR-VR), feedback systems. Gesture classification can replace alleviate the need for touch and clicks needed for HMI.

Various techniques disclosed herein employ a radar measurement of a scene including an object—e.g., a hand or finger or handheld object such as a stylus or beacon—to acquire data based on which the gesture classification can be implemented. For instance, a short-range radar measurement could be implemented. Here, radar chirps can be used to measure a position of one or more objects in a scene having extents of tens of centimeters or meters.

According to the various examples disclosed herein, a millimeter-wave radar unit may be used to perform the radar measurement; the radar unit operates as a frequency-modulated continuous-wave (FMCW) radar that includes a millimeter-wave radar sensor circuit, one or more transmitters, and one or more receivers. A millimeter-wave radar unit may transmit and receive signals in the 20 GHz to 122 GHz range. Alternatively, frequencies outside of this range, such as frequencies between 1 GHz and 20 GHz, or frequencies between 122 GHz and 300 GHz, may also be used.

A radar unit can transmit a plurality of radar pulses, such as chirps, towards a scene. This refers to a pulsed operation. In some embodiments the chirps are linear chirps, i.e., the instantaneous frequency of the chirps varies linearly with time.

A Doppler frequency shift can be used to determine a velocity of the target. Measurement data provided by the radar unit can thus indicate depth positions of multiple objects of a scene. It would also be possible that velocities are indicated.

Compared to camera-based gesture classification, gesture classification based on a radar measurements can have some advantages such as: invariant to illumination conditions; hand visibility occlusions; preserving privacy; capable of capturing subtle hand gesture motions.

Various techniques described herein employ a machine-learning algorithm to predict a gesture class of a gesture performed by an object. This is based on measurement data obtained from the radar measurement. The machine-learning algorithm could, accordingly, be referred to as a classification algorithm or a gesture classification algorithm.

An example implementation of the ML algorithm is a neural network algorithm (hereinafter, simply neural network, NN). An NN generally includes a plurality of nodes that can be arranged in multiple layers. Nodes of given layer are connected with one or more nodes of a subsequent layer. Skip connections between non-adjacent layers are also possible. Generally, connections are also referred to as edges. The output of each node can be computed based on the values of each one of the one or more nodes connected to the input. Nonlinear calculations are possible. Different layers can perform different transformations such as, e.g., pooling, max-pooling, weighted or unweighted summing, non-linear activation, convolution, etc. The NN can include multiple hidden layers, arranged between an input layer and an output layer.

The calculation performed by the nodes are set by respective weights associated with the nodes. The weights can be determined in a training of the NN. For this, a numerical optimization can be used to set the weights. A loss function can be defined between an output of the NN in its current training can then minimize the loss function. For this, a gradient descent technique may be employed where weights are adjusted from back-to-front of the NN.

There can be a spatial contraction and a spatial expansion implemented by one or more encoder branches and one or more decoder branches, respectively. I.e., the x-y-resolution of the input data and the output data may be decreased (increased) from layer to layer along the one or more encoder branches (decoder branches). The encoder branch provides a contraction of the input data, and the decoder branch provides an expansion.

At the same time, feature channels can increase and decrease along the one or more encoder branches and the one or more decoder branches, respectively. The one or more encoder branches and the one or more decoder branches are connected via a bottleneck.

A particular implementation of the NN is an auto-encoder NN. The autoencoder neural network, as a general rule, includes an encoder branch and a decoder branch that are sequentially arranged and connected via a bottleneck. Away from the input layer and the output layer and specifically at the bottleneck, latent feature representations (feature embeddings) are obtained.

The feature embedding can specify the presence or absence of certain features. The feature embedding thus can be seen as a compressed form of the input.

For the auto-encoder NN, based on the feature embedding, using the decoder branch, the aim is to re-construct the input. Thus, a loss function can be defined during training of the auto-encoder NN that penalizes differences between the input and the output. Accordingly, it is possible to train the auto-encoder NN using unsupervised learning.

A specific implementation of an ANN is the variational autoencoder NN (VAENN). A VAENN can be used in the various examples disclosed herein. A VAENN has a feature embedding that represents the latent features in a probabilistic manner. Specifically, a probability distribution of each latent feature of the feature embedding can be determined, typically a Gaussian distribution. The probability distribution can be defined by its mean and width. VAENNs are generally known to the skilled person, e.g., from Kingma, Diederik P., and Max Welling. "Auto-encoding variational bayes." arXiv preprint ar Xiv: 1312.6114 (2013).

Various techniques described herein are concerned with inference/prediction of a gesture class using a VAENN; further techniques described herein are concerned with the appropriate training of the VAENN.

According to various examples, it is possible to use a VAENN to predict a gesture class of a gesture performed by an object of the scene. More specifically, the prediction can be based on the feature embedding of the VAENN. This means that it would be possible to take into account, e.g., the mean or the width of the respective probabilistic distribution of each latent feature described by the feature embedding of the VAENN in order to determine whether or not a certain gesture belongs to a given gesture class. Here, the feature space can be structured into regions—the regions being associated with the different gesture classes and obtained from training of the VAENN—and it can be checked whether the distribution of the feature embedding of the VAENN obtained for certain measurement data falls within one of such regions. The regions can have an N-dimensional hyperspheroidal surface, where N is the dimension of the feature space.

Next, details with respect to input data provided to the VAENN will be described. As a general rule, the raw data samples obtained from an analog-to-digital converter (ADC) of a radar sensor can be pre-processed to obtain the input data. It has been found that certain type of input data is particularly helpful to facilitate accurate gesture classification.

As a general rule, in the various examples described herein, one or more positional time spectrograms—obtained from a radar measurement—can be used as the input for the VAENN.

Generally speaking, a spectrogram can encode the intensity of a respective contribution associated with a specific value of the positional observable in the raw data. A spectrogram can be a 2-D spectrogram which associated two positional observables, e.g., range and Doppler, or a positional observable and time, e.g., range and time.

A positional time spectrogram provides positional information of the object in the scene as a function of time. I.e., the positional time spectrogram illustrates a change of one or more positional degrees of freedom of the object in the scene with respect to the radar sensor (positional observable) over the course of time. The positional time spectrograms are an image-like representation of the time-dependency of positional observables. The radar sensor is able to measure radial distance, velocity and the angle of arrival of a target. Such information is encoded in the frequencies of the raw data obtained from the radar sensor. To unveil those physical observables, pre-processing of the raw data is applied, which yields the image-like representation of the physical observables over time.

The pre-processing of the raw data output from the ADC could include a 2-D Fast Fourier Transformation (FFT) of a data frame structured into fast-time dimension, slow-time dimension and antenna channels. The data frame includes data samples over a certain sampling time for multiple radar pulses, specifically chirps. Slow time is incremented from chirp-to-chirp; fast time is incremented for subsequent samples. The 2-D FFT can be along fast-time and slow-time dimension. This yields a range-doppler image (RDI). It would then be possible to select a range bin in the RDI. Based on the RDI, it is then possible to extract the various positional observables. For instance, the mean or maximum range and/or mean or maximum velocity/Doppler shift can be extracted. This yields the range and velocity (as mean of maximum value, or as intensity vector) as positional observables for a certain point in time associated with the sampling time of the data frame. It is also possible to apply beamforming to determine the mean/maximum elevation angle or azimuthal angle. This yields the elevation angle and azimuth angle (as mean or maximum value, or as intensity vector) as positional observables. It would be possible to aggregate multiple such positional observables to generate a positional time spectrogram.

Generally, various positional observables can be captured by the positional time spectrogram. For instance, positional information can be provided with respect to, e.g.: range, velocity, azimuthal angle, or elevation angle.

Such techniques of using positional time spectrogram in combination with a VAENN to predict a gesture class are based on the finding that gesture classification using radar measurements can be sensitive to user-specific variations of the gestures, senor noise characteristics, background environments and unknown gestures or background motions. Compared to conventional machine learning problems, gesture classification using radars have several major challenges to be addressed for deployment in a practical viable solution: For instance, the gesture classification should be able to handle large inter-class and low intra-class differences of gestures. The gesture classification should be able to reject arbitrary motions or unknown gestures. The gesture classification should be able to work under all alien background environments.

It has been observed that by using the VAENN that operates based on the positional time spectrograms, such challenges can be met.

In particular, an improved classification accuracy—by obtaining more discriminative classes—and random gesture rejection accuracy can be achieved, e.g., if compared to state-of-art deep metric learning approaches.

In particular, using such approaches, it is possible to consider the impact of disturbances. A Softmax classifier—as often used in the prior art—provides separability of classes, but no discriminative class boundaries. Hence, many background motions or other disturbance are erroneously predicted as one of the known classes with a high confidence using conventional techniques. As a result, reference techniques of gesture classification based on Softmax classifiers perform poorly in real environments. Such limitations are overcome by using the VAENN.

Further, the training is significantly simplified. For instance, it is not required to obtain training datasets including all random motions that may appear in real-world scenarios. This is because specific class extents are inherently obtained from the VAENN. The VAENN makes the feature space of the feature embedding continuous as well as implicitly makes the gesture classifications robust to misdetection and noise spurs.

According to various examples, the training can consider one or more losses that help to group gesture classes into closed-knit clusters in feature space, leading to better discriminative properties that facilitate rejection of arbitrary and random motions. Furthermore, clusters can be to be hyper-spheroidal allowing simple strategy to reject arbitrary motion images.

FIG. 1 schematically illustrates a system 65. The system 65 includes a radar sensor 70 and a processing device 60. The processing device 60 can obtain measurement data 64 from the radar sensor 70. A processor 62—e.g., a general purpose processor (central processing unit, CPU), a field-programmable gated array (FPGA), an application-specific integrated circuit (ASIC)—can receive the measurement data 64 via an interface 61 and process the measurement data 64. For instance, the measurement data 64 could include data frames including samples of an ADC converter. It would also be possible that further pre-processing is implemented at the radar sensor 70; for instance the radar sensor 70 could output 2-D spectrograms such as an RDI or an azimuth-elevation spectrogram or a range time spectrogram or a Doppler time spectrogram or an azimuth time spectrogram or an elevation time spectrogram.

The processor 62 may load program code from a memory 63 and execute the program code. The processor 62 can then perform techniques as disclosed herein, e.g., pre-processing measurement data 64, predicting a gesture class based on the measurement data 64, controlling an HMI, etc. Details with respect to such processing will be explained hereinafter in greater detail; first, however, details with respect to the radar sensor 70 will be explained.

Figure 2:
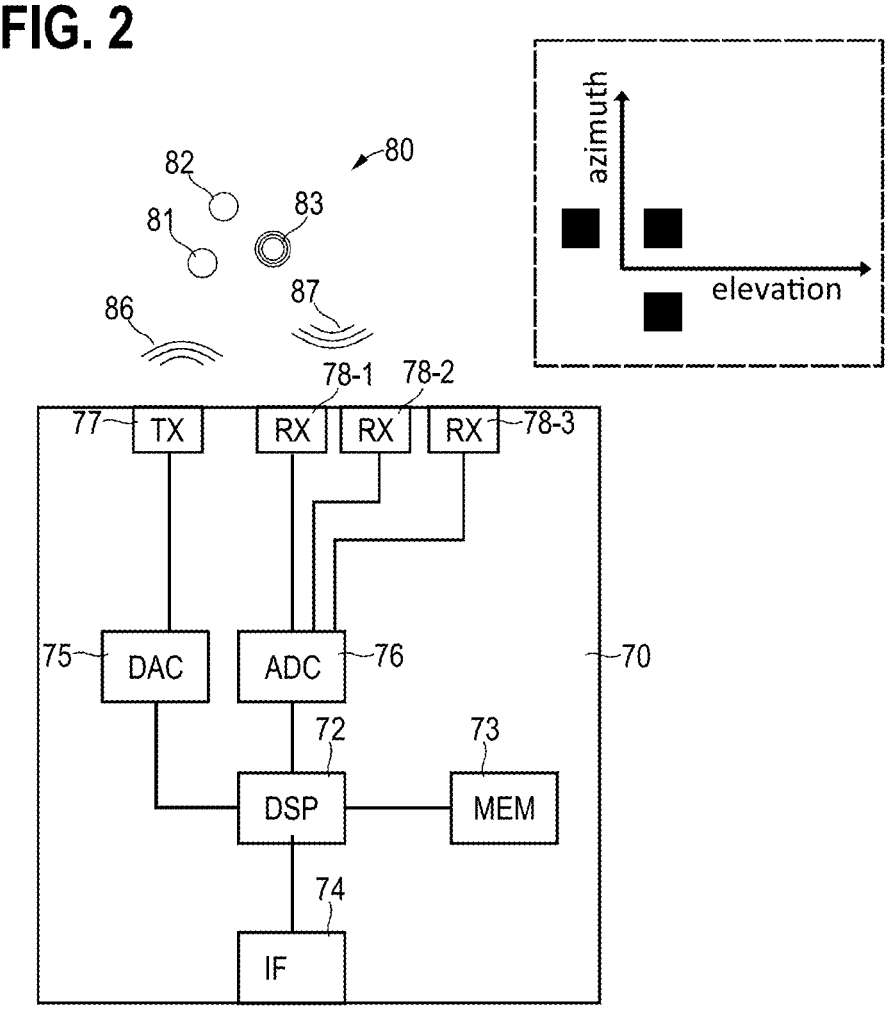
FIG. 2 schematically illustrates the radar sensor of FIG. 1 in further detail according to various examples.

FIG. 2 illustrates aspects with respect to the radar sensor 70. The radar sensor 70 includes a processor 72 (labeled digital signal processor, DSP) that is coupled with a memory 73. Based on program code that is stored in the memory 73, the processor 72 can perform various functions with respect to transmitting radar pulses 86 using a transmit antenna 77 and a digital-to-analog converter (DAC) 75. Once the radar pulses 86 have been reflected by a scene 80, respective reflected radar pulses 87 can be detected by the processor 72 using an ADC 76 and multiple receive antenna 78-1, 78-2, 78-3 (e.g., ordered in a L-shape with half a wavelength distance; see inset of FIG. 2). The processor 72 can process raw data samples obtained from the ADC 76 to some larger or smaller degree. For instance, data frames could be determined and output. Also, spectrograms may be determined.

The radar measurement can be implemented as a basic frequency-modulated continuous wave (FMCW) principle. A frequency chirp can be used to implement the radar pulse 86. A frequency of the chirp can be adjusted between a frequency range of 57 GHz to 64 GHz. The transmitted signal is backscattered and with a time delay corresponding to the distance of the reflecting object captured by all three receiving antennas. The received signal is then mixed with the transmitted signal and afterwards low pass filtered to obtain the intermediate signal. This signal is of significant lower frequency as the transmitted signal and therefore the sampling rate of the ADC 76 can be reduced accordingly. The ADC may work with a sampling frequency of 2 MHz and a 12-bit accuracy.

As illustrated, a scene 80 includes multiple objects 81-83. For instance, the objects 81, 82 may correspond to background, whereas the object 83 could pertain to a hand of a user. Based on the radar measurements, gestures performed by the hand can be recognized. Some gestures are illustrated in FIG. 3.

Figure 3:
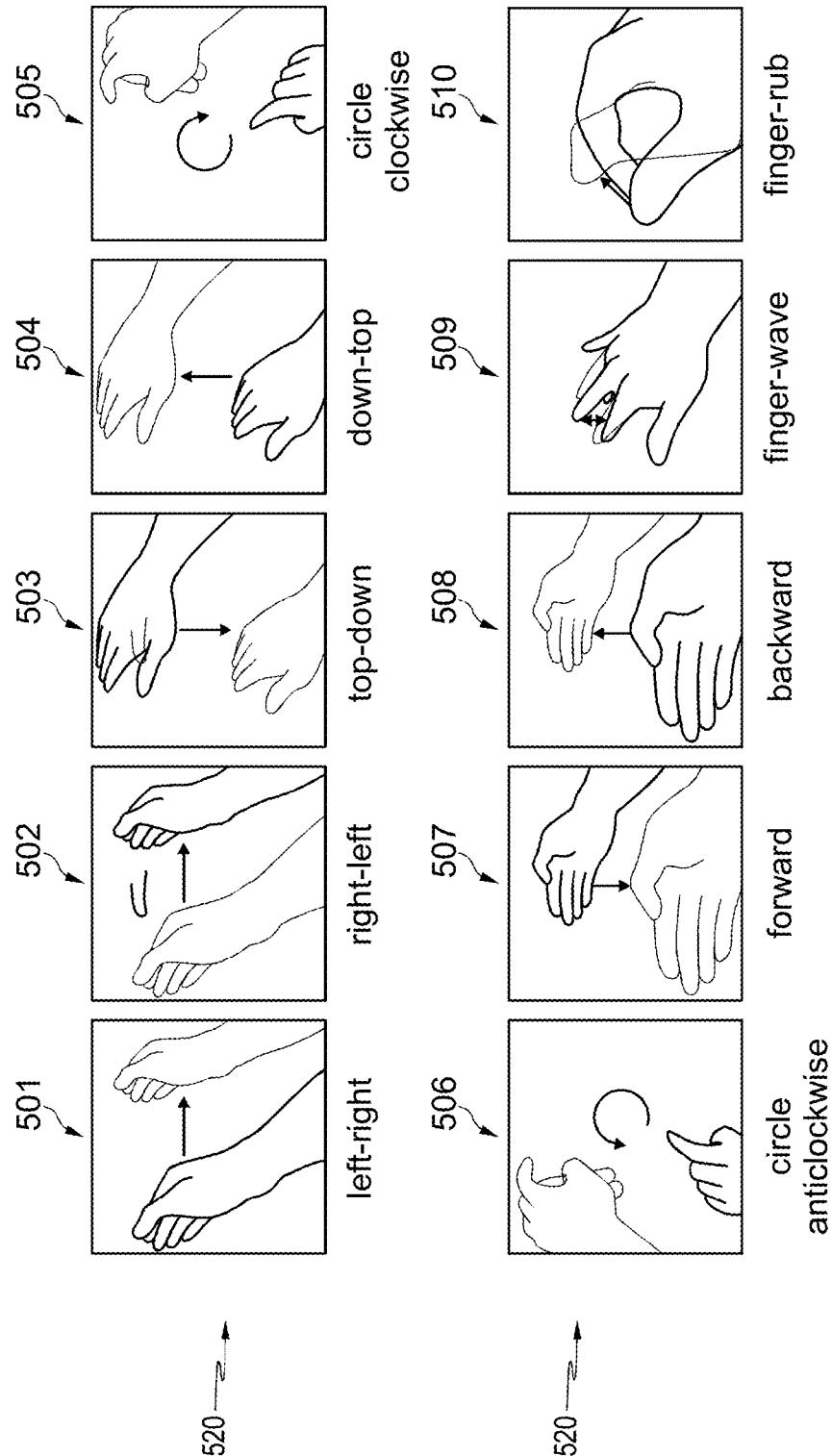
FIG. 3 schematically illustrates multiple gestures and associated gesture classes according to various examples.

FIG. 3 schematically illustrates such gestures 501-510 and corresponding labels of gesture classes 520, but other gestures are possible. According to the techniques described herein, it is possible to reliably and accurately classify the gestures 501-510. Details with respect to such gesture classification are explained in connection with FIG. 4.

Figure 4:
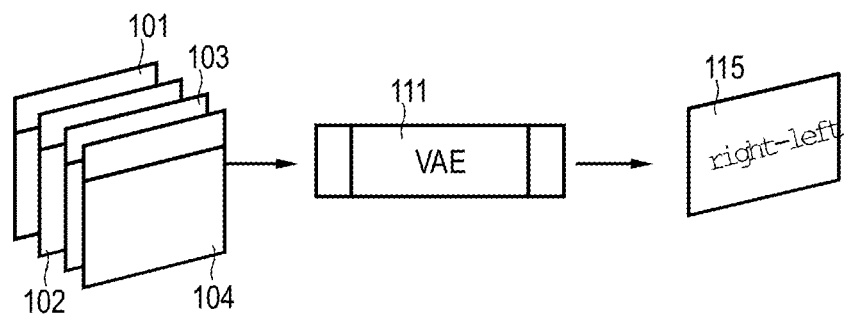
FIG. 4 schematically illustrates a processing pipeline for gesture classification using a variational auto-encoder neural network algorithm according to various examples.

FIG. 4 schematically illustrates a processing pipeline for implementing the gesture classification. For instance, such processing may be implemented by the processor 62 upon loading program code from the memory 63.

As a general rule, the VAENN 111 performs gesture classification based on the measurement data 64. The VAENN 111 provides, as output, a label 115 that is indicative of the particular gesture class 520 of the gesture recognized in the positional time spectrograms.

Before being input the VAENN 111, the measurement data 64 may be pre-processed. As illustrated in FIG. 4, multiple positional time spectrograms 101-104 can be provided as input to a VAENN 111.

While in FIG. 4 a count of four positional time spectrograms 101-104 is illustrated, as a general rule, fewer or more positional time spectrograms can be used as input to the VAENN 111. For instance, one or more positional time spectrograms can be used which are selected from the group including: range time spectrogram, velocity time spectrogram, an azimuthal angle time spectrogram, or an elevation angle time spectrogram.

As a general rule, it would be possible that raw positional time spectrograms and/or filtered positional time spectrograms are provided as an input to the VAENN 111. To obtain filtered positional time spectrograms, an appropriate filter may be applied. A smoothing filter could be applied. Such filtering may be achieved by using an unscented Kalman filter, as will be described later in greater detail.

The different positional time spectrograms 101-104 can be provided as different channels to the VAENN 111.

Next, details with respect to the VAENN 111 will be explained. First, training of the VAENN 111 and inference using the VAENN 111 will be explained in connection with FIG. 5.

Figure 5:
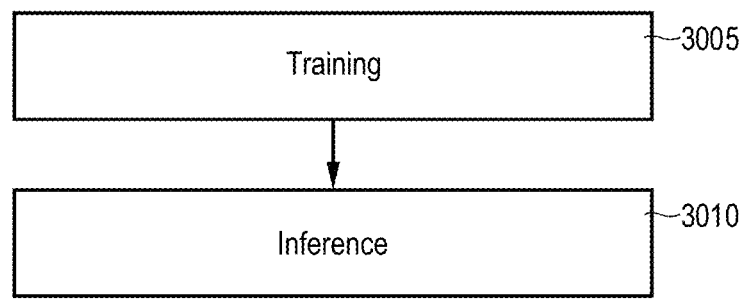
FIG. 5 schematically illustrates a flowchart of a method according to various examples.

FIG. 5 is a flowchart of a method according to various examples. The method can be executed by at least one processor, e.g., upon loading program code from a memory. For instances, the method of FIG. 4 could be executed by the processor 72 and/or the processor 62 (cf. FIGS. 1 and 2).

The method of FIG. 5 pertains to operation and maintenance of an NN such as the VAENN 111 of FIG. 4.

At box 3005, a training of the NN is implemented. Here, values of multiple parameters of the NN are set. This is generally based on one or more losses defined by a respective loss function. Each loss can correspond to a respective contribution of the loss function. Each loss can be determined based on a difference between a prediction of the NN in its current training state and a corresponding ground truth. Different losses use different metrics to quantify such difference and/or use different predictions and/or inputs.

An iterative optimization can be implemented. Here, multiple elements of a training set can be used to adjust the weights in multiple iterations. Each iteration can include a backpropagation training algorithm to adjust the weights starting from an output layer of the NN towards an input layer.

Once the training of box 3005 has been completed, inference can be implemented at box 3010. Here, a prediction of a gesture class of a gesture of a scene can be made without relying on corresponding ground truth. The weights of the NN as determined in the training of box 3005 are used.

Based on the inference at box 3010, it would be possible to implement one or more applications. For instance, it would be possible to control an HMI. A machine may be controlled using the HMI.

Figure 6:
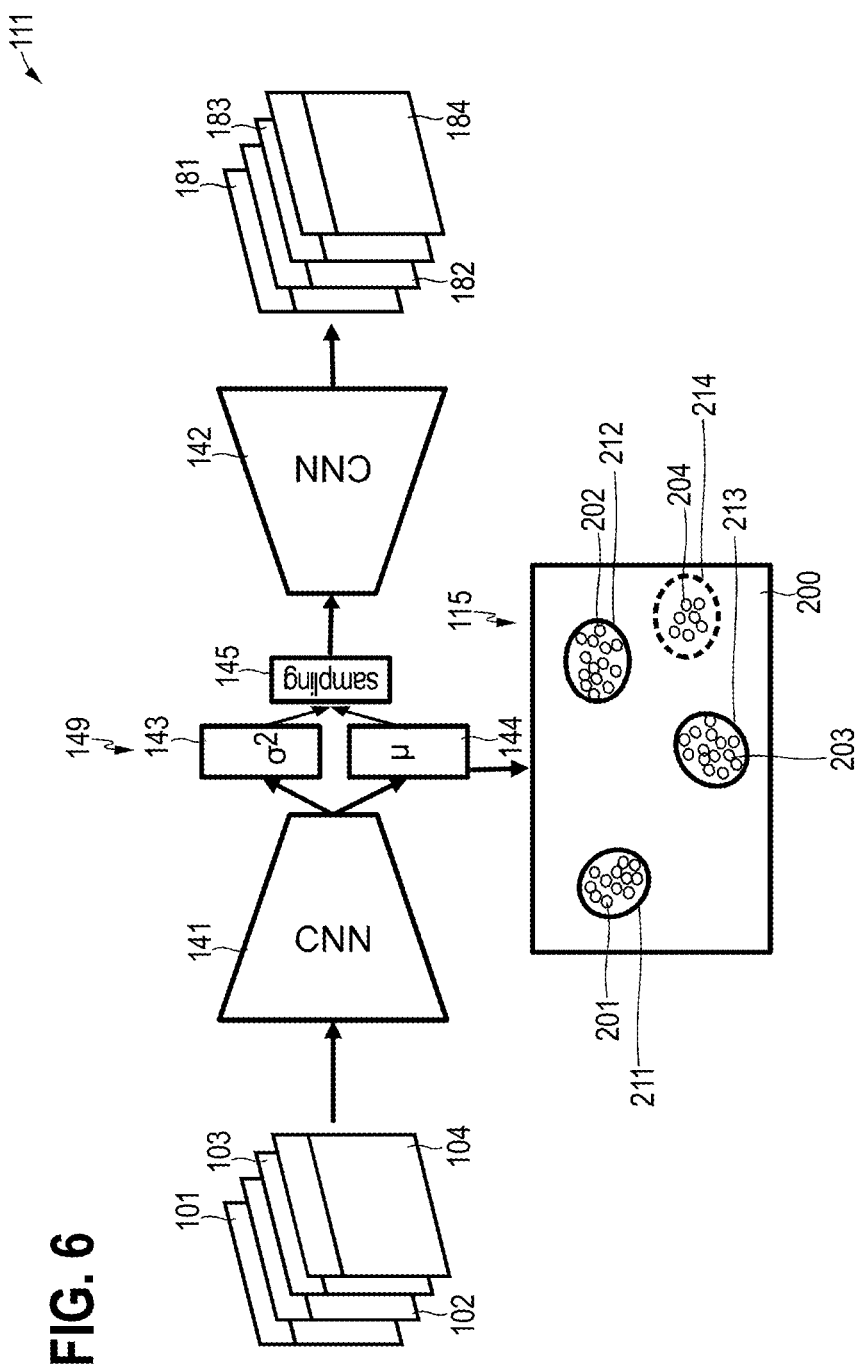
FIG. 6 schematically illustrates details of the variational auto-encoder neural network algorithm according to various examples.

FIG. 6 schematically illustrates aspects with respect to the VAENN 111. As illustrated in FIG. 6, the VAENN 111 includes an encoder branch 141 and a decoder branch 142. The decoder branch 142 operates on a feature embedding 149 representing latent features of the positional time spectrograms 101-104 provided as input to the encoder branch 141.

As a general rule, the decoder branch 142 may not be required during inference at box 3010 (cf. FIG. 5), but rather only during training at box 3005 to calculate a respective reconstruction loss.

The latent features are represented by the average position/mean value 144 and width 143 (e.g., standard deviation $\sigma^2$) of a respective probability distribution X. The probability distribution is sampled by a sampling operation 145 and the respective sampling points provide the input to the decoder branch 142. The decoder branch 142 outputs reconstructions 181-184 of the positional time spectrograms 101-104.

The gesture class 520 is predicted based on the feature embedding 149. The label 115—e.g., "L-R Swipe"—identifying the gesture class 520 is thus extracted from the feature embedding 149. This is explained in detail next.

In detail, it is possible to determine, for each one of multiple sets of positional time spectrograms 101-104, a respective data point 201-204 in latent feature space 200. I.e., each data point 201-204 describes a respective observation of a respective gesture. These data points 201-204 can correspond to the mean values 144. More generally, they could be determined based on the distribution, e.g., based on the mean values 144 and the width 143.

Then, there can be predefined regions 211-213 defined in the feature space 200 and it can be checked whether the data points 201-204 are within one of these predefined regions 211-213.

These predefined regions 211-213 can be obtained from the training of the VAENN, as will be disclosed in detail below.

Also illustrated in FIG. 6 is a scenario in which multiple data points 204 form a cluster 214 that is offset from any one of the predefined regions 211-213. It would be possible to use such cluster 214 to define a new gesture class, as will also be explained in further detail below.

As a general rule, there are many options available for implementing the encoder branch 141 and the decoder branch 142. A possible example is illustrated, along with the respective dimensions, in FIG. 7.

Figure 7:
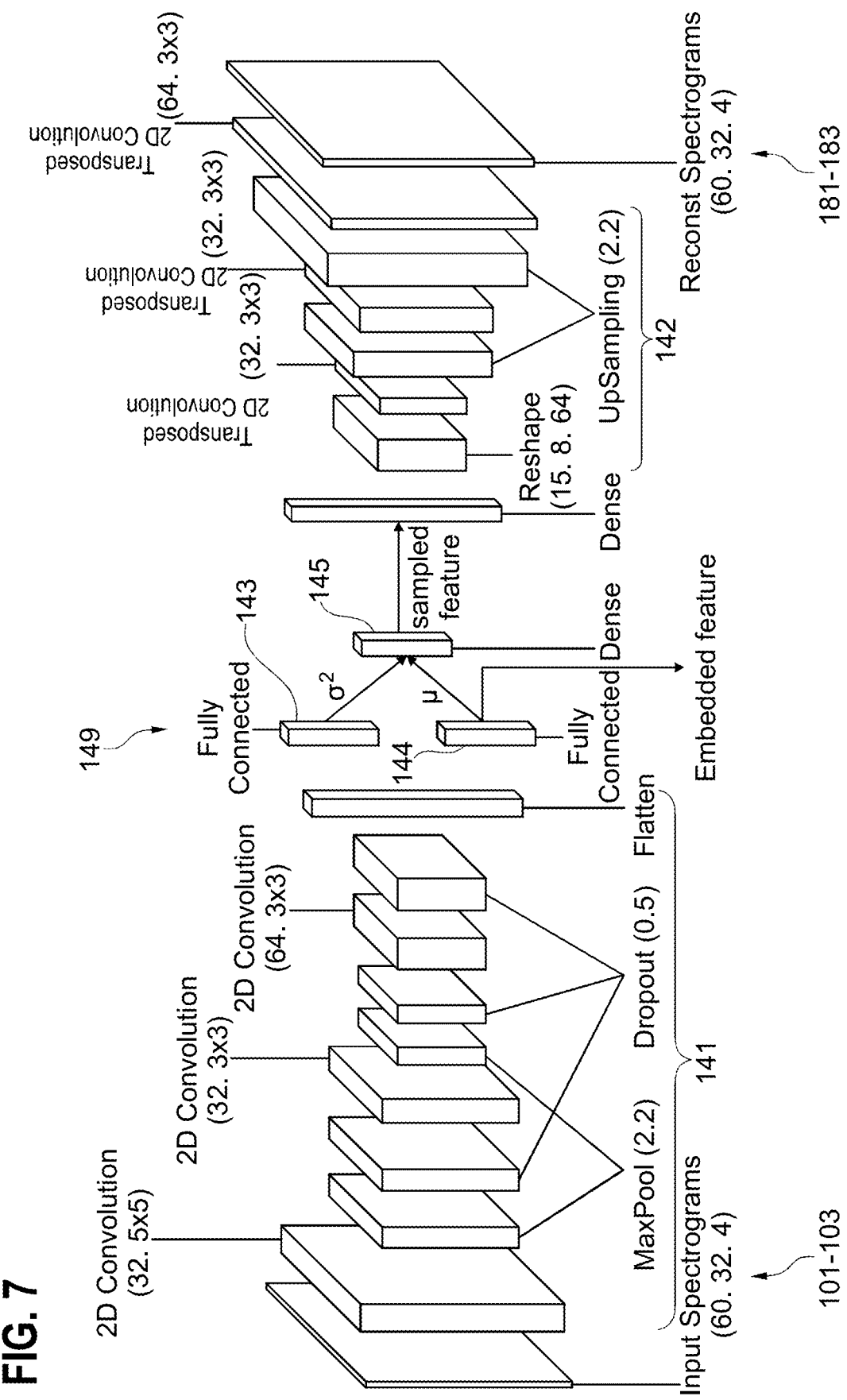
FIG. 7 schematically illustrates aspects of the variational auto-encoder neural network algorithm according to various examples.

FIG. 7 illustrates aspects with respect to the VAENN 111. FIG. 7 illustrates a specific example of an implementation of the encoder branch 141 and the decoder branch 142.

As illustrated, in FIG. 7, for the encoder branch 141 a total of four positional time spectrograms 101-104 is input as channel dimension, each having a dimensionality of 60×32 pixels. The encoder branch 141 includes three convolutional layers using filter sizes of (5×), (3×3) and (3×3) and 32, 32, and 64 channels followed by Dropout layers with rate 0.5. To reduce the date size, two max-pooling layers with pooling sizes (2,2) are added after the first two convolutional layers. Afterwards the tensor is flattened and projected to the feature space 200 using a fully connected layer with an output size of 32.

The decoder branch 142 generally corresponds to the encoder branch 141; here, the max-pooling layers are replaced by up-sampling layers and the convolutional layers are replaced by transposed convolutional layers.

Instead of a single fully connected layer (as would be used for an auto-encoder NN), the VAENN 111 uses two fully connected layers in parallel. The output of one fully connected layer is interpreted as the mean 144 of the Gaussian distribution of the feature embedding 149 and the other as the width 143 of the Gaussian distribution.

During training (when the decoder branch 142 is active), a value is sampled from this distribution and used for reconstructing the input; this is the sampling operation 145.

Due to this generative behavior, the input to the decoder branch 142 used for reconstruction is different every time, although the input sample as well as the ground truth label remain the same. Variations are effectively added to the input data. Thus, the VAENN 111 learns the mapping of embedded features generated by a continuous distribution to the same filtered image label. As a result, the feature space 200 is forced to be continuous and close-by embedded features are reconstructed to the same output. Therefore, the VAENN architecture already implicitly enforces close-knit class-clusters in the feature space 200. Due to the generative aspect of the architecture, smooth and compact class clusters are obtained. Thus, the proposed architecture is well suited to recognize embedded features produced by background motion.

Figure 8:
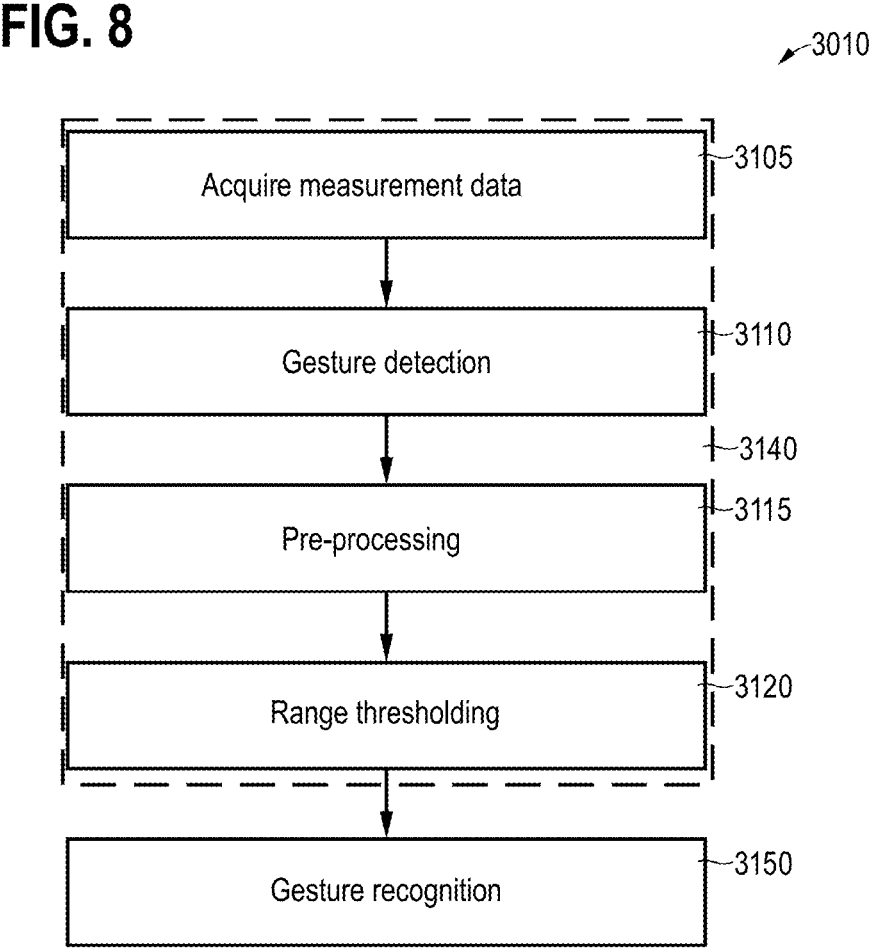
FIG. 8 is a flowchart of a method according to various examples.

FIG. 8 is a flowchart of a method according to various examples. The method of FIG. 8 can be executed by a processor, upon loading program code from a memory. For instance, the method of FIG. 8 could be executed by the system 65. For instance, at least parts of the method of FIG. 8 could be implemented by the processor 62 of the device 60. It would also be possible that at least some parts of the method are executed by the DSP 72 of the radar sensor 70 (cf. FIG. 2).

The method of FIG. 8 implements gesture classification. Based on a radar measurement, it is possible to classify an observed gesture. Accordingly, the method of FIG. 8 can implement the inference according to box 3010 of the method of FIG. 5. The gesture classification can be implemented using the VAENN 111 as explained above.

The method of FIG. 8 includes multiple boxes 3105, 3110, 3115, and 3120 that together implement obtaining—box 3140—input data for performing a gesture classification at box 3150.

As a general rule, obtaining the input data for performing the gesture classification at box 3140 can be configured differently in various examples. For instance, depending on the kinds and type of the input data, box 3140 can be implemented differently. For illustration, in a simple scenario, the input data could be pre-acquired and stored in a memory. It would also be possible that the pre-processing is performed by the radar sensor. Hereinafter, one example implementation of box 3140 will be explained in connection with boxes 3105, 3110, 3115, and 3120, but other implementations are possible. This implementation will be described by making reference to FIG. 8, and as well to FIGS. 9 to 14. The implementation that will be explained below facilitates predicting a gesture class of a gesture based on one or more positional time spectrograms, as explained above in connection with FIG. 4.

Initially, at box 3105, raw data is acquired by using a radar measurement. This can include triggering transmission of radar chirps and reading data samples output from an ADC (cf. FIG. 2: ADC 76).

Figure 9:
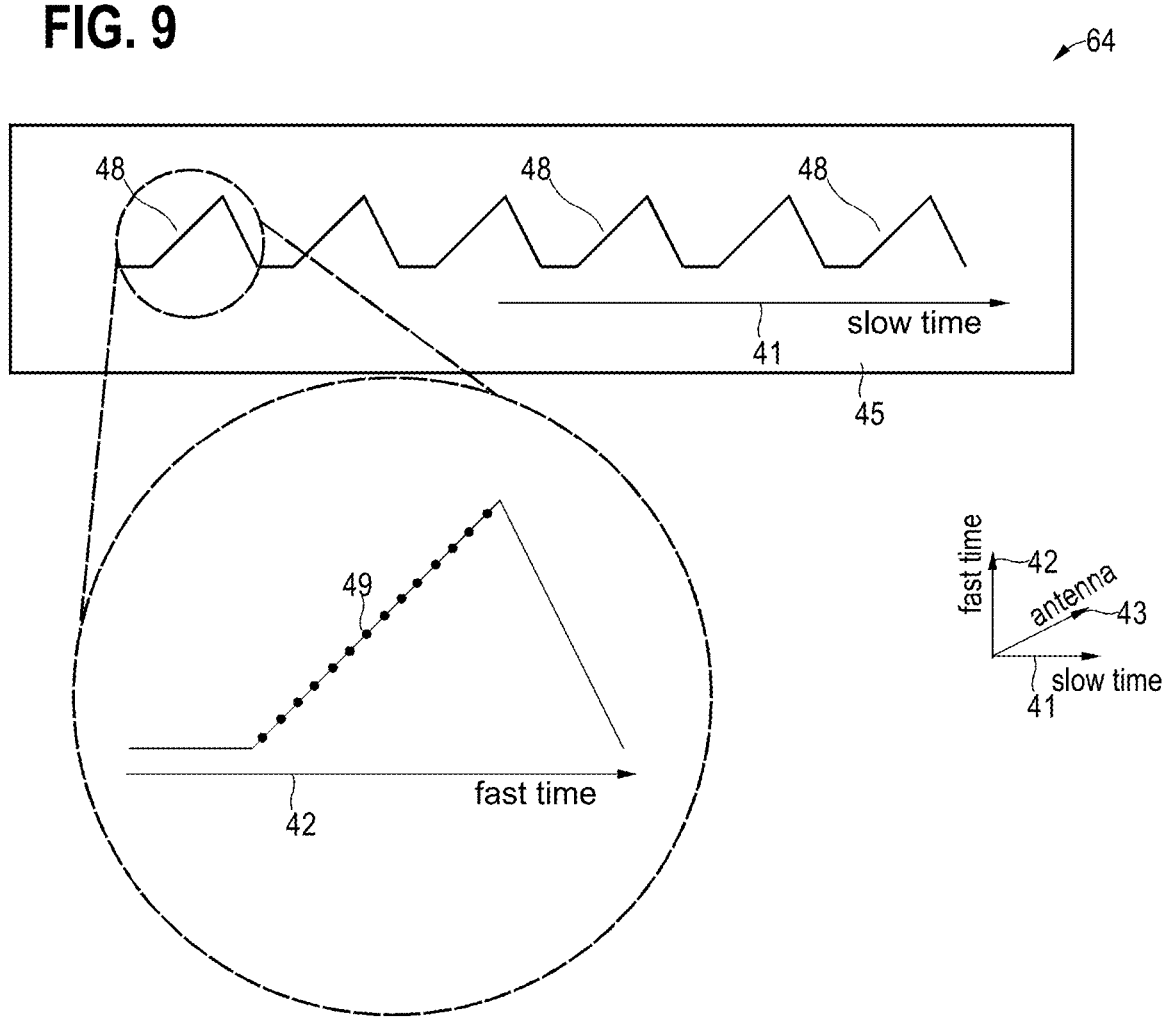
FIG. 9 schematically illustrates a data frame including data samples of radar measurement data according to various examples.

The data samples 49 are illustrated in FIG. 9.

FIG. 9 schematically illustrates aspects with respect to the measurement data 64. FIG. 9 schematically illustrates a structure of raw data in form of a data frame 45.

Typically, a data frame 45 is defined by arranging data samples 49 obtained as raw data from the ADC (as explained in connection with FIG. 2) with respect to a fast-time dimension 42 and a slow-time dimension 41 (FIG. 9 is a schematic illustrative drawing; instead of sampling the received signal directly, the ADC samples a processed signal obtained from mixing the transmitted signal with the received signal; this is generally referred to as a Frequency-Modulated Continuous Wave, FMCW, radar measurement). A position along the fast time dimension 42 is incremented for each subsequent readout from the ADC (this is illustrated in the circular inset in FIG. 9), whereas a position along the slow time dimension 41 is incremented with respect to subsequent radar chirps 48. There can be an additional dimension which is the antenna dimension 43 (not illustrated in FIG. 9), which provides angular resolution based on beamforming. For instance, in FIG. 2, an example with three receive channels has been discussed.

The duration of the data frames 45 is typically defined by a measurement protocol. For instance, the measurement protocol can be configured to use 32 chirps within a data frame 45. The chirps repetition time is set to $T_{PRT}=0.39$ ms, which results in a maximum resolve Doppler velocity of $v_{max}=3.25$ ms$^{-1}$. The frequency of the chirps may range from $f_{min}=58$ GHz to $f_{max}=63$ GHz and therefore covers a bandwidth of B=5 GHz. Hence, the range resolution is $\Delta r=3.0$ cm. Each chirp is sampled 64 times with a sampling frequency of 2 MHz resulting in a total observable range of $R_{max}=0.96$ m. Typically, the frame repetition frequency may be set to 30 frames per second.

Thus, typically, the duration of the data frames 45 is much shorter than the duration of a gesture (gesture duration). Accordingly, it can be helpful to aggregate data from multiple subsequent data frames 45 to determine the time duration covered by each positional time spectrograms 101-103. Aspects related to such aggregation are illustrated in FIG. 10.

Figure 10:
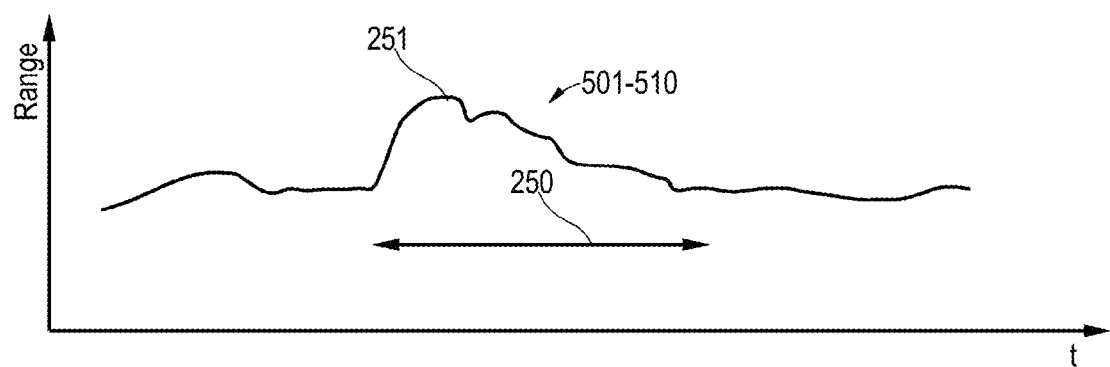
FIG. 10 schematically illustrates a time dependency of a range estimate obtained from the radar measurement data and in presence of a gesture being performed according to various examples.

FIG. 10 schematically illustrates the dependency of the measured range 251 of an object 83 on time. As illustrated, it is possible to determine a time duration 250 during which a gesture 501-510 is performed (gesture duration). In detail, as illustrated in FIG. 10, during the gesture duration 250, the range 251 observed by the radar measurement changes significantly as a function of time—i.e., at a large change rate. Before and after the gesture duration 250, the range 251, on the other hand, is comparably static. While FIG. 10 illustrates, for illustrative purposes, the range 251 as an example of an observable of the radar measurement, also other observables-such as velocity or angle-could exhibit such qualitative behavior. More generally, the gesture duration 250 could correspond to a time duration of increased activity observed in the scene 80.

According to various examples, it can be possible to perform a gesture detection in order to determine the gesture duration 250. Measurement data outside the gesture duration 250 could then be discarded or, at least, not used for the gesture classification.

Accordingly,—and again referring to FIG. 8—at box 3110, it is possible to perform a gesture detection. The gesture detection—different to the gesture classification implemented at box 3150—does not need to discriminate between different types of gestures, but rather solely identifies that a gesture is performed.

It would then be possible to discard (e.g., set to zero) data outside the gesture duration 250 which defines a start time and stop time of the gesture being performed. This can be referred to as time gating.

As a general rule, the positional time spectrograms can be obtained by time gating the measurement data of the radar measurement based on one or more corresponding trigger events. These one or more trigger events can be associated with the gesture detection.

There are various options available for implementing such trigger events to facilitate the gesture detection. For instance, it would be possible to implement a comparison between a change rate of a positional observable (e.g., range or velocity or azimuth or elevation angle) the measurement data and a predefined threshold (cf. FIG. 10, there are sudden changes at the beginning of the gesture duration 250 and only a small/no changes towards the end of the measurement time duration). Accordingly, it would be possible to define a start time of the gesture duration 250 with respect to significant changes in the range or another positional coordinate such as velocity or angle. Alternatively or additionally, the stop time of the gesture duration 250 can be defined with respect to changes in the range or another positional coordinate such as velocity or angle falling below a respective threshold.

Alternatively or additionally to such threshold-based gesture detection, it would be possible to use a gesture detection algorithm. For instance, a respectively trained NN may be implemented that detects absence or presence of a gesture, e.g., based on range data.

In a specific example, the gesture duration 250 per gestures is pre-set or initialized at 2 s. Within this time, the test person has to perform the gesture. Some gestures like the swipes are performed in a much shorter time period, and therefore, after recording, the start and end of a gesture is detected, based on the trigger events. Thus, the gesture duration 250 is refined. The data samples within the refined gesture duration 250 are preserved, whereas the remaining data samples are set to zero. The start of a gesture is detected, if for example the energy within 10 frames 45 increases over a threshold compared to the energy of the first frame 45 in the series. The end of gesture is similarly detected when a drop of energy larger then the threshold is detected, as the trigger event.

Then, the measurement data is optionally preprocessed at box 3115, to obtain the positional time spectrograms. Thus, at box 3115 separate spectrograms of the range, Doppler (velocity), azimuth and elevation are obtained from the measurement data 64. Such spectrograms show the temporal progress of the respective physical observable and allow a unique identification of a specific gesture.

Figure 11:
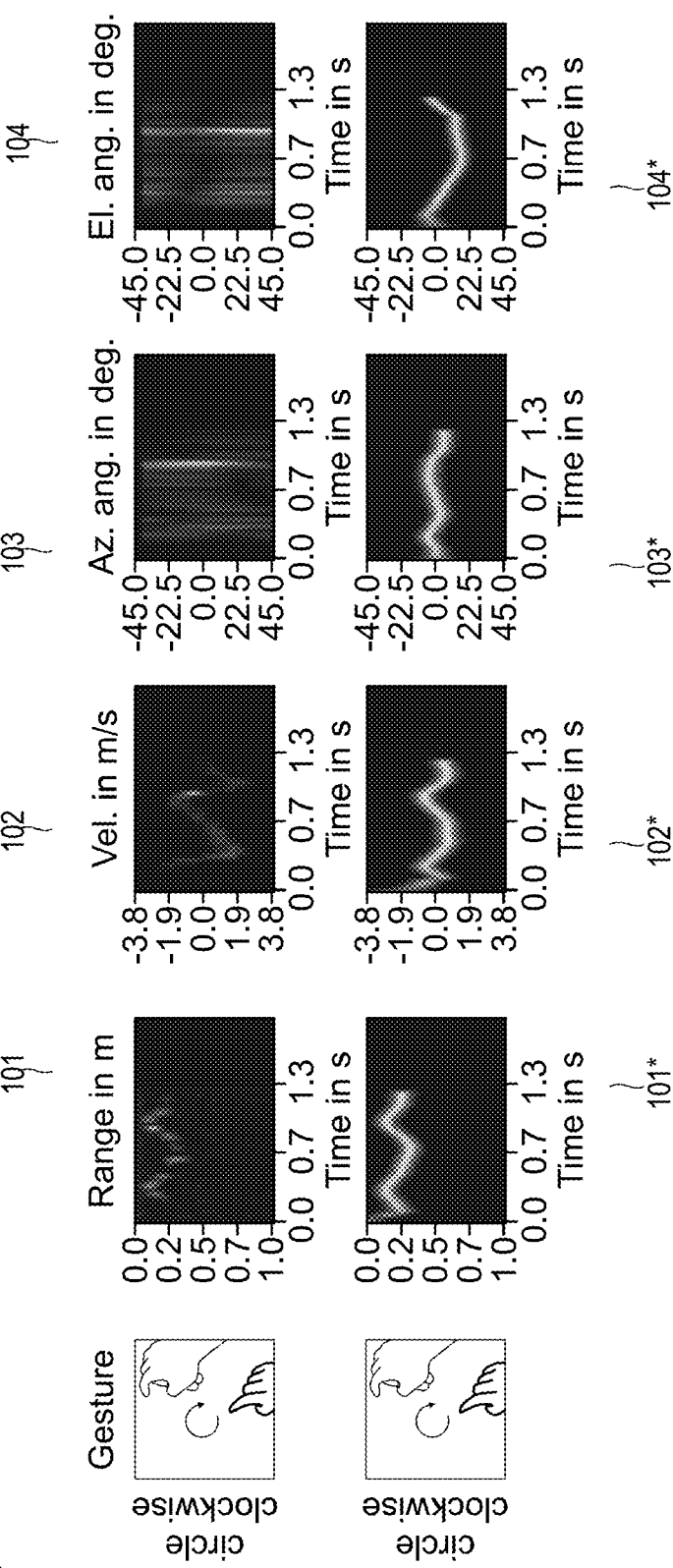
FIG. 11 schematically illustrates raw and filtered positional time spectrograms for a "circle-clockwise" gesture according to various examples.
Figure 12:
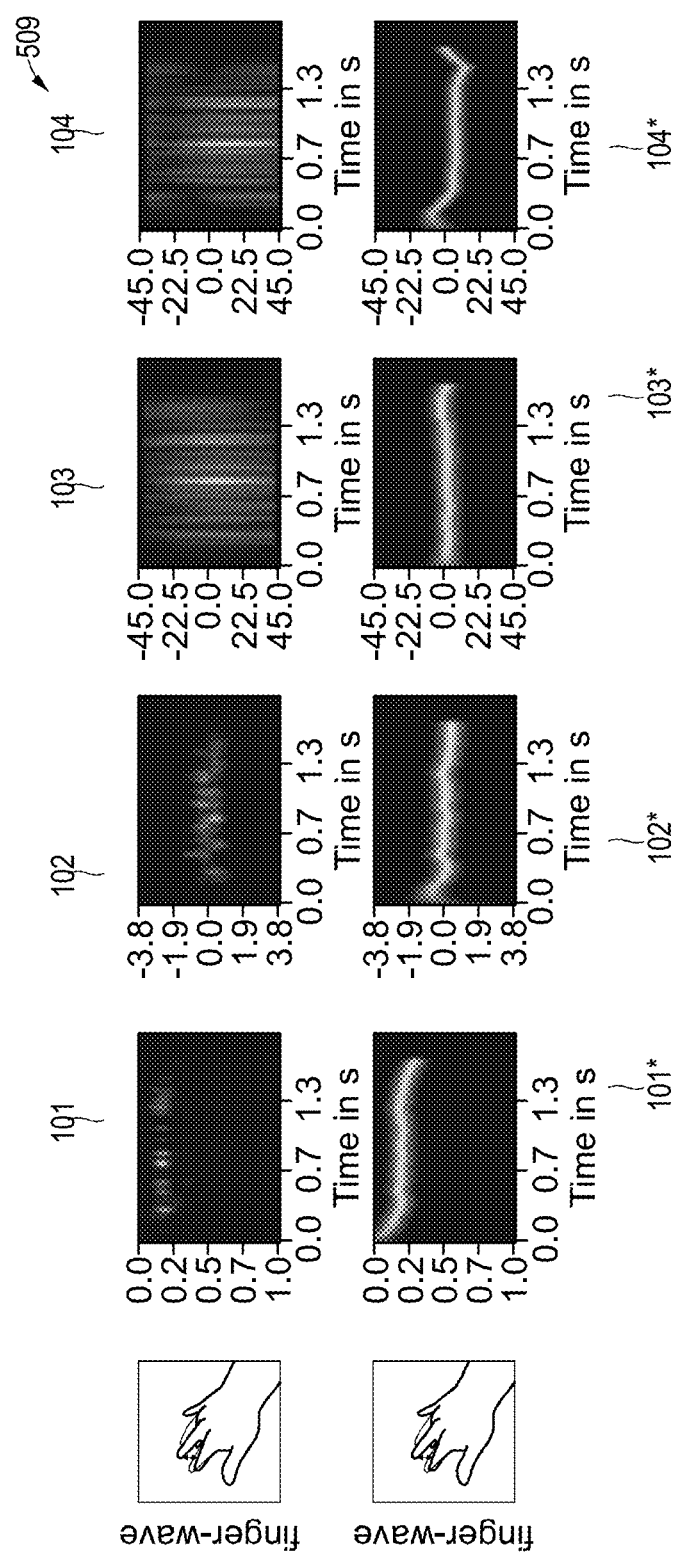
FIG. 12 schematically illustrates raw and filtered positional time spectrograms for a "finger wave" gesture according to various examples.

FIG. 11 and FIG. 12 illustrate the positional time spectrograms 101-104, 101*-104* for range, velocity, azimuthal and elevation angle, respectively. This is for two gestures 505, 509. The contrast of the 2-D image-like representations encodes the intensity of a respective positional observable.

In detail, FIG. 11 and FIG. 12—upper row—illustrate unfiltered positional time spectrograms 101-104; while FIG. 11 and FIG. 12—lower row—illustrate filtered positional time spectrograms 101*-104* (the filtering will be explained in detail below).

Since the radar measurement is sensitive to radial distance and radial velocity, the range and Doppler spectrograms of some gestures, such as, e.g., left-right, right-left, forward and backwards swipe, have similar signatures. However, the right-left and left-right swipes are performed along azimuth direction whereas backward and forward swipe is performed along elevation direction. Hence, estimating azimuth and elevation angle can be used to differentiate those gestures. Thus, to resolve ambiguities in the gesture classification, it can be helpful to use range, velocity, elevation and azimuth time spectrograms.

Figure 13:
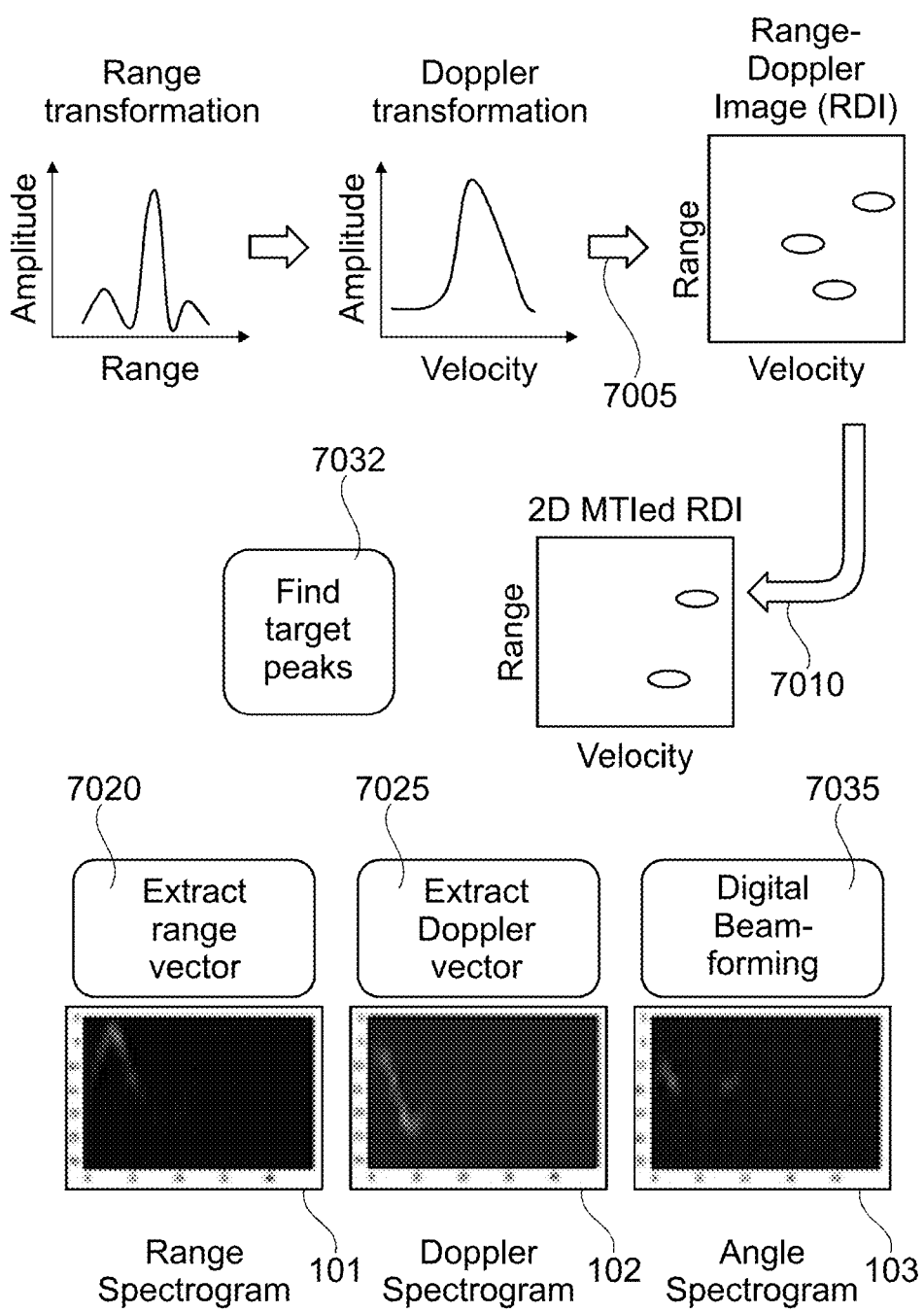
FIG. 13 schematically illustrates a processing pipeline for determining positional time spectrograms according to various examples.
Figure 14:
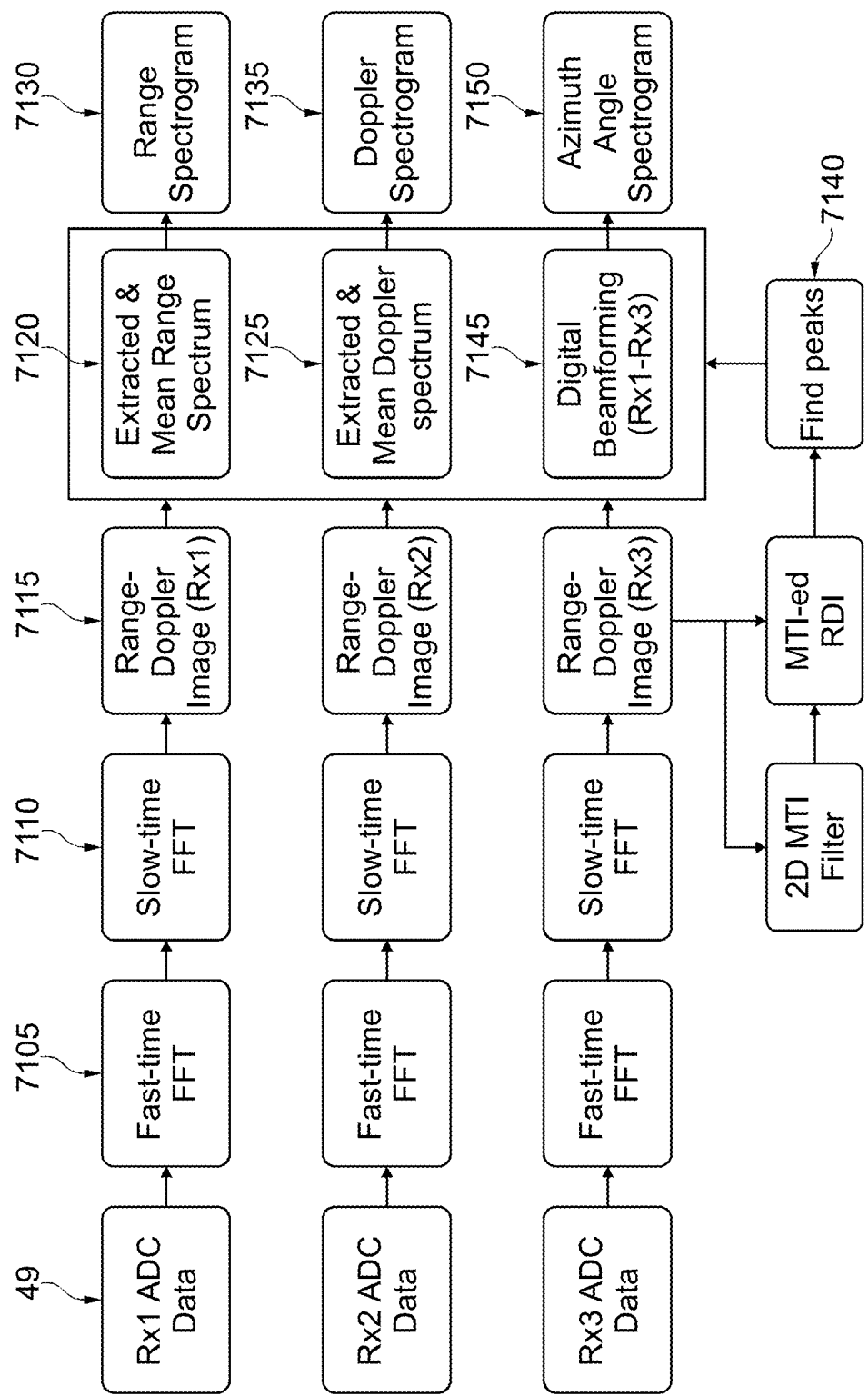
FIG. 14 schematically illustrates a processing pipeline for determining positional time spectrograms according to various examples.

To generate the positional time spectrograms, the range-Doppler image (RDI) of each frame is generated in a first step (cf. FIG. 13: 7005; FIG. 14: boxes 7105, 7110, 7115). This is done by 2D windowing of each data frame followed by a 2-D FFT defined as $$v_{RDI}(p, l) = \left| \sum_{m=1}^{N_{st}} \sum_{n=1}^{N_{ft}} \sum_{m=1}^{} \sum_{n=1}^{} w(m, n)s(m, n)e^{-j2\pi\left(\frac{mp}{N_{st}} + \frac{nl}{N_{ft}}\right)} \right| \quad (1)$$

where w(m, n) is the 2D weighting function along the fast-time and slow-time and s(m, n) is signal within a data frame. The indices n, m sweep along the fast-time 42 and slow-time 41, while l, p sweep along the range and Doppler axes respectively. $N_{st}$ and $N_{ft}$ are the number of chirps 48 and number of samples 49 per chirps 48 respectively (cf. FIG. 9).

To reduce the impact of static background objects, a moving target indication (MTI) in form of an exponentially weighted moving average (EWMA) filter may be applied on the RDIs (cf. FIG. 13:7010).

The EWMA is defined as $$x_{MTI} = x_i - x_{avg}$$

$$x_{avg} = ax_i + (1-a)x_{avg} \quad (2)$$

where $x_{MTI}$ is the MTI filtered RDI, $x_1$ is the RDI of the current time step and $x_{avg}$ is the average RDI of the filter.

From each MTI-filtered RDI, a range and a Doppler vector can be extracted (cf. FIGS. 13:7020 and 7025; FIG. 14: boxes 7120 and 7125). The selected vectors-within the gesture duration 250 at which a gesture 501-510 is detected—are aggregated/concatenated and form the range and Doppler spectrograms respectively. The range vectors and correspondingly the Doppler vectors are selected based on marginalization along each axis, they are appended across time to generate the range spectrogram and Doppler spectrogram respectively (cf. FIG. 14: boxes 7130 and 7135).

For each MTI-filtered RDI, the range-Doppler bin with maximum energy is selected on which digital beam forming over multiple receiving channels—i.e., the antenna dimension 43—is applied (cf. FIG. 13: box 7035; FIG. 14, boxes 7140 and 7145). This is done by multiplying the selected range-Doppler data x with phase shifts sweeped across the field of view, i.e.

$$f(\hat{\theta}) = \sum_{j=1}^{N_c} x_j \exp\left(-j\frac{2\pi d^j \sin(\hat{\theta})}{\lambda}\right) \quad (3)$$

where $x_j$ is the complex valued selected range-Doppler bin of the $j^{th}$ channel, $\hat{\theta}$ is the estimated angle sweeped across the field of view at predefined angular steps. To estimate the azimuthal angle, the data of receiving antennas 1 and 3 and for the elevation angle the data of antennas 2 and 3 is used.

Again, a concatenation of these vectors for each data frame 45 within the gesture duration 250 fields the respective time angle spectrogram (cf. FIG. 14: box 7150).

In some examples, it would be possible to apply filtering to the (raw) positional time spectrograms 101-104 as a further operation during the pre-processing at box 3115 during inference 3010. An unscented Kalman filter may be explained (details will be explained in connection with box 7005 in FIG. 15). FIG. 11 and FIG. 12 illustrates respective filtered positional time spectrograms **101\*-104\***.

After the pre-processing at box 3115 that forms the (filtered) positional time spectrograms 101-104, **101\*-104\*, it is optionally possible, at box 3120**, to perform range thresholding. Here, it would be possible to discard such positional time spectrograms that capture movements of an object that is located outside of a predefined range threshold.

Next, at box 3150, it is possible to predict the gesture class of a gesture performed by the object based on the positional time spectrograms and based on a feature embedding 149 of the VAENN.

Specifically, it would be possible that the gesture class is predicted based on a comparison of the mean 144 of the distribution of the feature embedding 149 of the positional time spectrograms with one or more of the predefined regions 211-213 defined in the feature space 200 of the feature embedding 149 (cf. FIG. 6). These predefined regions 211-213 can be obtained from the training of the VAENN (cf. FIG. 5: box 3005). Next, techniques with respect to the training will be described.

Figure 15:
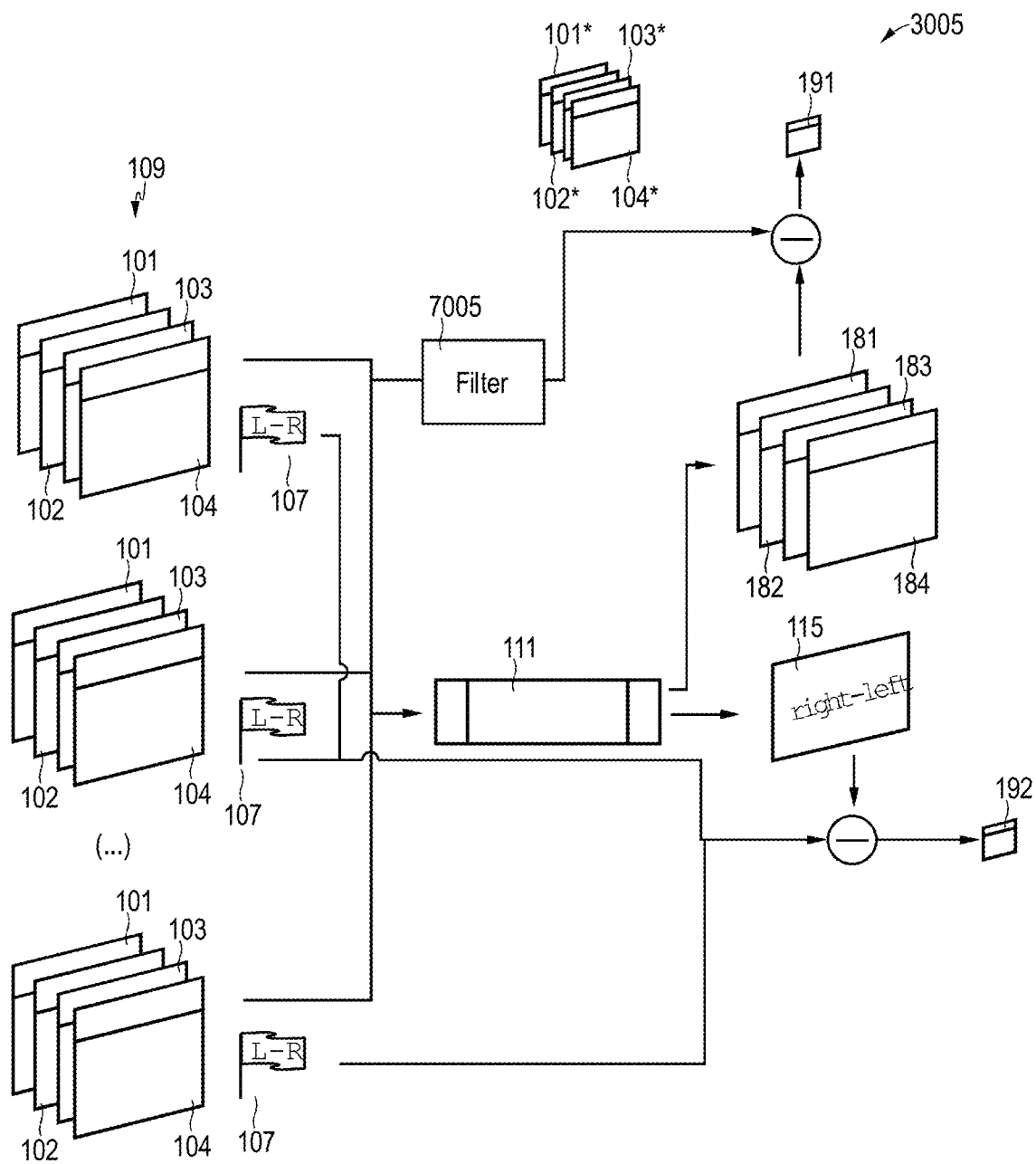
FIG. 15 schematically illustrates a processing pipeline for training a variational auto-encoder neural network algorithm according to various examples.

FIG. 15 schematically illustrates aspects with respect to the training of the VAENN 111. FIG. 15 illustrates a processing pipeline for implementing the training. The processing pipeline can thus implement box 3005.

The training of the VAENN 111 is based on multiple training sets 109 of training positional time spectrograms 101-104, **101\*-104\* and associated ground-truth labels 107**.

These training positional time spectrograms 101-104, **101\*-104\* can be obtained using the pre-processing described in connection with box 3115 of the method of FIG. 8; in particular, the UKF can be used to obtain the filtered positional time spectrograms 101\*-104\*. Again, as already explained above, it would be possible that the VAENN 111 receives, as input, the raw and filtered positional time spectrograms 101-104, 101\*-104\* (in FIG. 15, only the raw spectrograms 101-104** are shown as input).

The ground-truth labels 107 denote the gesture class 520 of the gesture 501-510 captured by the respective positional time spectrograms 101-103.

It is then possible to compare the output 181-184, 115 of the VAENN 111 with respective ground truth. Illustrated in FIG. 15 are two losses 191, 192 that can be considered.

A first loss 191 (an image-based reconstruction loss) is based on a difference between the reconstructions 181-184 of the respective input positional time spectrograms 101-104 and data associated with the input positional time spectrograms 101-104. More specifically, in the illustrated example, the input (raw) positional time spectrograms 101-104 are filtered at box 7005, e.g., using an Unscented Kalman filter, to obtain respective filtered positional time spectrograms **101\*-104\* (cf. FIG. 11 and FIG. 12). These filtered positional time spectrograms 101\*-104\* are then compared with the reconstructions 181-184. For instance, a pixel-wise difference could be calculated (cf. Eq. 12). Accordingly, the VAENN 111 is trained to reconstruct filtered positional time spectrograms 101\*-104\***.

Next, details with respect to the filtering at box 7005 will be explained. As a general rule, such filtering can be helpful for training (cf. FIG. 5: box 3005). Optionally, filtering may sometimes also be used for inference (cf. FIG. 5: Box 3010) and then be executed as part of the pre-processing (cf. FIG. 8: box 3115).

In the scenario of FIG. 15, the VAENN 111 is trained to reconstruct the filtered positional time spectrograms **101\*-104\*. Then, during inference, it may not be required to implement the filtering. Not having to rely on the filtering during inference (by appropriately training the VAENN 111**) makes the implementation of the gesture classification fast and robust.

To filter—e.g., smoothen—the positional time spectrograms, an unscented Kalman filter (UKF) may be applied to the positional time spectrograms. Here, for each time step—e.g., the respective point in time associated with the underlying data frame 45—the maximum value of each positional time spectrogram is extracted, which serves as the measurement vector for the UKF. Due to filtering, outliers and measurement errors are mitigated, but on the other hand also "micro" features are removed. Especially for the gestures finger-wave and finger-rub these micro features can be important since the hand is kept static and only small finger movements define the gesture.

Referring to FIG. 11 and FIG. 12, on the one hand, it can be seen that filtering emphasizes the overall movement of the hand and removes outliers (FIG. 11 and FIG. 12: lower rows). Especially the angle estimation using only two antennas tend to have large variances in its results. Thus, the filtering is helpful to remove outliers. On the other hand, it can be seen that class-specific (and thus generally desirable) "micro" features can also be filtered out. For instance, this is apparent when comparing the filtered elevation angle time spectrograms 104\* for the gesture classes "circuit clockwise" and "finger wave" according to FIG. 11 and FIG. 12: both spectrograms 104\* have a comparable qualitative shape (peak-plateau-dip)-micro features distinguishing these spectrograms 104\* are removed due to the filtering.

As a general rule, the unscented transformation—used in the UKF—tries to approximate the distribution of a random variable that undergoes a non-linear transformation. Considering a Gaussian random variable $\eta$ with mean $\mu$ and covariance $\Omega$, on performing a non-linear transformation $\psi=\phi(\eta)$ also leads to another Gaussian distribution. In this case, $\phi$ represents both process model (.) and measurement model h(.). The unscented transform is used to generate sigma points $\chi$ such that the distribution of $\psi$ can be approximated by the mean and covariance defined as $$E[\psi] = \sum_{i=0}^{N} W_i \phi(x^{(i)}) \quad (4)$$

$$Cov\{\psi\} = \sum_{i=0}^{N} W_i (\phi(x^{(i)}) - E[\psi])(\phi(x^{(i)}) - E[\psi])^T$$

where χ(i) are the 'sigma points' and Wi are the consecutive weights. In total 2nη+1 'sigma points' are generated with nη being the dimension of the state n and computed as $$x^{(0)} = \mu \quad (5)$$

$$x^{(1)} = \mu + \sqrt{\left(\frac{n}{1-W_i}\right)} \Omega_i^{\frac{1}{2}}, i = 1, 2, \ldots, n_\eta$$

$$x^{(i+n)} = \mu - \sqrt{\left(\frac{n}{1-W_i}\right)} \Omega_i^{\frac{1}{2}}, i = 1, 2, \ldots, n_\eta$$

where $$W_i = \frac{1-W_0}{2n} \text{ and } \Omega_i^{\frac{1}{2}}$$

is the i-th column of $$\Omega^{\frac{1}{2}}$$

which is the Cholesky decomposition of matrix $\Omega$. The state vector of the UKF is defined as $x=[rv\theta\dot{\theta}\phi\dot{\phi}]$, where r and v are the radial position and velocity respectively, $\theta$ and $\phi$ are the azimuth and elevation angles and $\dot{\theta}$ and $\dot{\phi}$ are the respective angular velocities. The UKF assumes a Gaussian random variable for the distribution of the state vector. The linear measurement model (.) accounts for the trivial transformation of state vector into measurement domain. H(.) only extracts the range, velocity, azimuth end elevation angle from the state vector x. Hence, the measurement vector is defined as z=Hx. The process model defines the non-linear state transition or prediction into the next time step. The process model transformation for x can be defined as (other motion models are possible):

$$r_p = r + \Delta tv + 0.5\Delta t^2 a_r \quad (6)$$

$$v_{p=v+\Delta t a_r}$$

$$\theta_p = \theta + \dot{\theta}\Delta t + 0.5\Delta t^2 a_\theta$$

$$\dot{\theta}_p = \theta + \Delta t a_\theta$$

$$\phi_p = \phi + \dot{\phi}\Delta t + 0.5\Delta t^2 a_\phi$$

$$\dot{\phi}_p = \dot{\phi} + \Delta t a_\phi$$

where de and ag are random angular accelerations drawn from a normal distribution with zero mean and a variance of π/180.

The measurement and process noise matrices are set using normalized innovation squared test and ensured that the chi-square distribution is within 95% confidence score.

The output of the UKF is a series of filtered state vectors. These can be concatenated to obtain a respective filtered positional time spectrogram 101*-104*. Each vector in the spectrogram is constructed by generating a Gaussian with mean and variance of its corresponding UKF filtered output state.

These filtered training positional time spectrograms 101*-104* can then be used to determine the first loss 191.

A second loss 192 is based on a difference between the prediction of the gesture class 520 and the respective ground-truth labels 107.

More generally, various losses can be considered, and some examples will be given below.

An example of the second loss 192 is the triplet loss which maximizes inter-class distance. The triplet loss is generally known from. Ge, W. Huang, D. Dong, and M. R. Scott. 2018. Deep Metric Learning with Hierarchical Triplet Loss. CoRR abs/1810.06951 (2018). arXiv: 1810.06951. The idea of the triplet loss is to feed three samples (i.e., three training sets 109 of positional time spectrograms 101-104) into VAENN 111. The first training set 109 it the anchor, the second training set 109 is a random sample of the same gesture class and the third training set 109 is a random sample of another gesture class.

The distance between anchor sample and either positive or negative sample is defined as $$d(x_1, x_2) = (x_1 - x_2)^T (x_1 - x_2) \quad (7)$$

where $x_1$ is the anchor and $x_2$ is either the positive or negative sample.

When using the VAENN, the embedding is modeled as Gaussian distribution, as explained above. Thus, in one example, it would be possible to use $$d(\mu_1, \mu_2) = (\mu_1 - \mu_2) + (\mu_1 - \mu_2). \quad (8)$$

Here $\mu_1$, $\mu_2$, denote the means 144 of the respective distributions of the samples. In some examples, beyond using the distance between the centers of the distributions, a statistical distance could be considered. For example, the Mahalanobis distance between the anchor distribution and the mean of either the positive or negative distribution may be evaluated.

As a general rule, beyond the Mahalanobis distance, other statistical distances between a point and a distribution or between two distributions are possible, e.g., such as the Wasserstein metric or the Cramer von Mises metric.

The statistical distance based on the Mahalanobis distance is defined as $$d^{stat}(\mu_a, \Sigma_a, \mu_2) = (\mu_a - \mu_2)^T \Sigma_a^{-1} (\mu_a - \mu_2) \quad (9)$$

where $\mu_a$ and $\Sigma_a$ are the mean and covariance matrix of the anchor distribution $X_a$, and $\mu_2$ is either the mean of the positive or negative sample distribution, respectively.

For the purpose of this evaluation of the statistical distance, it is possible to assume that the covariance matrix $\Sigma_a$ has only none-zero entries on its diagonal.

The triplet loss (based on Eq. 8) and statistical distance triplet loss (based on Eq. 9) are respectively defined as $$L_{triplet} = \max(d(\mu_a, \mu_p) - d(\mu_a, \mu_n) + \alpha, 0), \quad (10)$$

$$L_{triplet}^{stat} = \max(d^{stat}(\mu_a, \Sigma_a, \mu_p) - d^{stat}(\mu_a, \Sigma_a, \mu_n) + \alpha, 0) \quad (11)$$

where $\mu_a$ and $\Sigma_a$ define the anchor distribution $X_a$, $\mu_p$ and $\mu_n$ are the mean feature vectors of positive and negative sample respectively and a is a hyper-parameter. Both the triplet loss as well as the statistical triplet loss may be used in examples disclosed herein.

As a result, the triplet loss evaluates the distance between single embedded feature vectors of anchor, positive and negative, whereas the statistical distance triplet loss operates on distributions.

In other words, the statistical triplet loss is determined based on the statistical distances between the distribution of the feature embedding 149 obtained for the anchor set and the means of the distributions obtained for the positive and negative sets 109, respectively.

Thus, it evaluates the distance between the anchor distribution and the mean vector of positive and negative sample.

Next, the reconstruction loss 191 will be described.

The reconstruction loss 191 aims to minimize the difference between the reconstructed images and the label images, e.g., the filtered positional time spectrograms **101\*-104\***. As a metric the mean squared error defines as $$L_{MSE} = \sum_{c=0}^{C-1} \sum_{n=0}^{N-1} \sum_{m=0}^{M-1} (Y_{rec} - Y_{lab})^2 \qquad (12)$$

where C is the number of channels, N and M are the dimensions of the input/output images (here, the filtered positional time spectrograms **101\*-104\*; and the respective reconstructions 181-184), $Y_{rec}$ are the reconstructions 181-184 and $Y_{lab}$ are the label images (here, the filtered positional time spectrograms 101\*-104\***).

Next, a further loss will be described that is specific to the VAENN architecture.

For the VAENN 111, the feature embedding 149 of an input sample is modeled as a multivariate Gaussian distributed random variable X. The underlying and unknown distribution is approximated by a multivariate standard Gaussian distribution. The difference between the underlying distribution of the feature embedding 149 and the multivariate standard Gaussian distribution is evaluated using the Kullback-Leibler (KL) divergence defined as $$L_{KL} = D_{KL}\left[N(\mu(X), \sum(X)) \| N(0, 1)\right] = \frac{1}{2} \sum_{k=0}^{K-1} \left(\sum(X)_k + \mu(X)_k^2 - 1 - \log \sum(X)_k\right) \qquad (13)$$

where K is the dimension of a random variable X and $\mu(X)_k$ and $\Sigma(X)_k$ is the mean an variance value of its kth dimension. The resulting divergence defines the KL-Divergence loss. By optimizing the KL-divergence the maximization of the variational lower bound is achieved. Next, a further example of the second loss 192 will be described. This is a center loss.

The center loss minimizes the Euclidean intra-class distances and therefore leads to more discriminative classes.

The standard center loss is defined as $$L_{center} = \sum_{c \in C} (\hat{\mu}_c - x_c)^T (\hat{\mu}_c - x_c) \qquad (14)$$

where C is the set of all classes, $\hat{\mu}$ is the estimated mean of class c, and $x_c$ is the embedded feature vector of a set 109 associated to class c.

Since the VAENN 111 operates with distributions in the feature space 200, a re-formulation of the classical center loss towards a statistical-distance-based center loss, which minimizes the spread of samples according to its underlying class distribution, is possible.

As a general rule, a class distribution is defined by a combination of the multiple distributions of the feature embedding 149 of the VAENN 111 obtained for all sets of input data associated with a given class.

Under the assumption that the embedded distributions are independent and identically distributed, (i.e., the covariance matrix only has non-zero entries on its diagonal), the class distribution can be estimated by the mean/average of the embedded distributions of all samples associated to the same class.

As a result the mean of a class distribution is defined as $$\hat{\mu}_c = \frac{1}{|X_c|} \sum_{x \in X_c} \mu_x$$

and the variance is defined as $$\hat{\sigma}_c^2 = \frac{1}{|X_c|^2} \sum_{x \in X_c} \sigma_x^2,$$

$X_c$ is the set of embedded feature distributions belonging to class c. The covariance matrix $\Sigma_c$ is defined as a diagonal matrix with $\sigma_c^2$ entries.

Based on the estimated class distribution, the Mahalanobis distance (or another statistical distance) can be used to evaluate the statistical distance center loss defined as $$L_{center}^{stat} = \sum_{c \in C} (\hat{\mu}_c - x_c)^T \hat{\Sigma}_c^{-1} (\hat{\mu}_k - x_c) \qquad (15)$$

where C is the set of all classes, $\hat{\mu}_c$ is the estimated mean of class c, $\hat{\Sigma}_c$ is the estimated covariance matrix of class c and $x_c$ is the embedded mean of a sample belonging to class c.

As will be appreciated from Eq. 15, the statistical distance center loss is determined based on the statistical distance between the class distribution of each gesture class and the respective means of the distribution of the feature embeddings of the VAENN obtained for all training samples associated with this gesture class.

The overall loss that is minimized during training the VAENN may be given by $$L_{VAE} = \propto_1 L_{triplet}^{(stat)} + \propto_2 L_{MSE} + \propto_3 L^{KL} + \propto_4 L_{center}^{(stat)} \qquad (16)$$

where $\propto_1$ to $\propto_4$ are hyper-parameters that can be predefined.

As will be appreciated from Eq. 16, the (statistical) triplet loss helps to maximize the inter-class distance, while the (statistical distance) center loss helps to minimize the intra-class distance.

Next, it will be explained how the gesture classification based on the feature embedding 149 is facilitated. This is based on the class distributions of the feature embedding 149 of the trained VAENN 111.

Based on the class distributions of the feature embedding 149 of the VAENN 111 obtained for the training sets 109 of training positional time spectrograms 101-104 belonging to each gesture class, it is possible to determine the regions 211-213 in the feature space 200 used during gesture classification in the inference phase at box 3010. Each region 211-213 is thus associated with a respective gesture class 520.

For instance, these regions 211-213 could be centered around the respective means 144 of the class distributions and have a size that is determined in accordance with the standard deviations 143.

These regions 211-213 may be stored as parameters along with the VAENN 111 and then used during inference at box 3010. It can be decided whether the mean 144 of a certain instance of the feature embedding is inside or outside such regions 211-213.

As will be appreciated, sometimes a scenario may occur in which a further gesture—not covered by any gesture class of the sets 109 of training positional time spectrograms—is performed multiple times. I.e., a further gesture class may be observed. This is illustrated in FIG. 6 by data points 204 in the feature space 200 included in a cluster 214 that is offset to any of the pre-trained regions 211-213.

In such a scenario, it may not be required to retrain the VAENN 111, e.g., using the losses discussed in connection with Eq. 16. Rather, it may be sufficient to monitor a cluster formation of the respective means 144 of the distribution of the feature embedding outside the predefined regions 211-213.

Then, based on such monitoring of the cluster formation, it would be possible to determine a further predefined region in the feature space 200 to enclose a respective cluster 214.

Summarizing, above, techniques of performing a gesture classification of a gesture performed by an object such as a hand or finger are disclosed. The gesture classification is based on a radar measurement. To predict the gesture class, a VAENN is used. By using the VAENN, it is possible to add variations to the input data during training-using a sampling operation-without the need of augmenting the input data. Thereby, a robustness against noise or clutter is increased. Also, user-specific variations of the gestures can be captured.

Examples of training the VAENN have been disclosed. Specifically, techniques have been disclosed which rely on a statistical distance such as the Mahalanobis distance when determining a respective loss.

This is motivated by the feature embedding of the VAENN architecture being implemented by distributions instead of single vectors. Thus, more accurate results for distances from a distribution of the feature embedding can be obtained, thereby increasing the accuracy of the training. By using statistical distances for determining the overall loss, nonlinear characteristics of the data can be accurately learned and the accuracy of the gesture classification is increased. Specifically, a sensitivity of the performance of the gesture classification on the training strategy is reduced. It is possible of creating close-knit embedding clusters.

In detail, it is possible to determine class distributions, e.g., based on the assumption of an underlying Gaussian distribution. This can be done under the assumption that the distributions of the feature embedding of the samples of a gesture class are independent and distributed identically across the class. Accordingly, it is possible to calculate the class distribution as the average of all distributions of the feature embedding obtained for of all training sets of a specific gesture class.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been disclosed according to which multiple positional time spectrograms are used as input data to the VAENN. As a general rule, it would also be possible to provide just a single positional time spectrogram—e.g., a range spectrogram—as input data to the VAENN.

For further illustration, various techniques have been described in the framework of a radar-based gesture classification. The proposed VAENN can also be applied for achieving a robust gesture classification using other sensors such as vision, ultra-sonic sensors and any other sensor capable of receiving gesture feedback.

For still further illustration, in some disclosed examples, the raw data obtained from the radar sensor undergoes a preprocessing step (cf., e.g., box 3115) to obtain features relevant for the purpose of gesture classification. Although the preprocessing methodology is specific to radar sensors, similar specific gesture feature extraction process can be performed for other sensor such as velocity and range information where applicable.

For still further illustration, the possible gesture classification is not limited to just hand gesture but virtually any form of gesture feedback such as body pose or facial expressions.

For still further illustration, various examples have been disclosed where a statistical distance is determined and considered in a loss for training the VAENN. The disclosed embodiments are not limited to a statistical distance between a distribution and a point (mean), but can also be applied to a distance between two distributions.

What is claimed is:

1. A method comprising:
    obtaining one or more positional time spectrograms of a radar measurement of a scene comprising an object; and
    based on the one or more positional time spectrograms and based on a feature embedding of a variational auto-encoder neural network, predicting a gesture class of a gesture performed by the object, wherein the gesture class is predicted based on a comparison of a mean of a distribution of the feature embedding of the variational auto-encoder neural network with one or more regions predefined in a feature space of the feature embedding.

2. The method of claim 1, further comprising:
    monitoring a cluster formation of the means of the distribution of the feature embedding of the variational auto-encoder neural network obtained for multiple sets of the one or more positional time spectrograms, the cluster formation being outside of the one or more predefined regions; and
    based on the monitoring of the cluster formation, determining a further predefined region in the feature space to enclose a respective cluster.

3. The method of claim 1, wherein the one or more positional time spectrograms are obtained by time gating measurement data of the radar measurement based on at least one trigger event.

4. The method of claim 3, wherein the at least one trigger event comprises a comparison between a change rate of a positional observable captured by the measurement data and at least one predefined threshold.

5. The method of claim 3, wherein the at least one trigger event comprises an output of a gesture detection algorithm.

6. The method of claim 1, wherein the one or more positional time spectrograms are selected from the group consisting of: a range time spectrogram, a velocity time spectrogram, an azimuthal angle time spectrogram, and an elevation angle time spectrogram.

7. The method of claim 1, wherein the one or more positional time spectrograms comprise one or more raw positional time spectrograms, and wherein the variational auto-encoder neural network has been trained to reconstruct one or more filtered positional time spectrograms.

8. A method for training a variational auto-encoder neural network for predicting a gesture class of a gesture performed by an object of a scene, the gesture class being selected from a plurality of gesture classes, the method comprising:
    obtaining multiple training sets of one or more training positional time spectrograms of a radar measurement of the scene comprising the object, each one of the multiple training sets being associated with a respective ground-truth label indicative of the respective gesture class;
training the variational auto-encoder neural network based on the multiple training sets and the associated ground-truth labels; and
based on class distributions of a feature embedding of the variational auto-encoder neural network obtained for the multiple training sets associated with each one of the plurality of gesture classes, determining predefined regions in a feature space of the feature embedding for gesture class prediction.

9. The method of claim 8, wherein the training of the variational auto-encoder neural network uses at least one loss that is determined based on at least one statistical distance between a distribution of a feature embedding of the variational auto-encoder neural network obtained for a first training set of the multiple training sets that is associated with a first gesture class of the plurality of gesture classes, and at least one mean of at least one distribution of a feature embedding of the variational auto-encoder neural network obtained for at least one second training set of the multiple training sets that is associated with at least one of the first gesture class or a second gesture class of the plurality of gesture classes.

10. The method of claim 9, wherein the at least one loss comprises a statistical distance triplet loss determined based on a first statistical distance and a second statistical distance, the first statistical distance being between the distribution of the feature embedding of the variational auto-encoder neural network obtained for an anchor training set of the multiple training sets and the mean of the distribution of the feature embedding of the variational auto-encoder neural network obtained for a positive training set of the multiple training sets, the second statistical distance being between the distribution of the feature embedding of the variational auto-encoder neural network obtained for the anchor training set and the mean of the distribution of the feature embedding of the variational auto-encoder neural network obtained for a negative training set of the multiple training sets.

11. The method of claim 9, wherein the at least one loss comprises a statistical distance center loss determined based on a statistical distance between a class distribution associated with the first gesture class and means of the distributions of the feature embedding of the variational auto-encoder neural network obtained for all training sets of the multiple training sets associated with the first gesture class.

12. The method of claim 9, wherein the statistical distance is a Mahalanobis distance.

13. The method of claim 8, wherein the one or more training positional time spectrograms comprise one or more raw training positional time spectrograms, the method further comprising:
applying an unscented Kalman filter to the one or more raw training positional time spectrograms to obtain one or more filtered training positional time spectrograms, wherein the training of the variational auto-encoder neural network uses at least one reconstruction loss which is based on a difference between a reconstruction of the one or more raw training positional time spectrograms output by the variational auto-encoder neural network and the one or more filtered training positional time spectrograms.

14. A radar system comprising:
a millimeter-wave radar sensor configured to transmit radar signals towards a scene, receive reflected radar signals from the scene, and generate radar measurement data based on the reflected radar signals; and
a processor configured to:
generate one or more positional time spectrograms based on the radar measurement data, and
based on the one or more positional time spectrograms and based on a feature embedding of a variational auto-encoder neural network, predict a gesture class of a gesture performed by an object in the scene, wherein the gesture class is predicted based on a comparison of a mean of a distribution of the feature embedding of the variational auto-encoder neural network with one or more regions predefined in a feature space of the feature embedding.

15. The radar system of claim 14, wherein the processor is further configured to:
monitor a cluster formation of the mean of the distributions of the feature embedding of the variational auto-encoder neural network obtained for multiple sets of the one or more positional time spectrograms, the cluster formation being outside of the one or more predefined regions; and
based on the monitoring of the cluster formation, determine a further predefined region in the feature space to enclose a respective cluster.

16. The radar system of claim 14, wherein the one or more positional time spectrograms are obtained by time gating measurement data of a radar measurement based on at least one trigger event, and wherein the at least one trigger event comprises a comparison between a change rate of a positional observable captured by the radar measurement data and at least one predefined threshold.

17. The radar system of claim 14, wherein the one or more positional time spectrograms comprise at least one of: a range time spectrogram, a velocity time spectrogram, an azimuthal angle time spectrogram, and an elevation angle time spectrogram.

18. The radar system of claim 14, wherein the processor comprises:
at least one first processor; and
at least one memory with instructions stored thereon, wherein the instructions, when executed by the at least one first processor, enable the processor to generate the one or more positional time spectrograms, and predict the gesture class of the gesture performed by the object in the scene.

19. The radar system of claim 14, wherein the one or more positional time spectrograms are obtained by time gating measurement data of a radar measurement based on at least one trigger event, and the at least one trigger event comprises an output of a gesture detection algorithm.

20. The radar system of claim 14, wherein the one or more positional time spectrograms comprise one or more raw positional time spectrograms, and wherein the variational auto-encoder neural network has been trained to reconstruct one or more filtered positional time spectrograms.

* * * * *